US012759295B2

(12) United States Patent
Lim et al.

(10) Patent No.: US 12,759,295 B2
(45) Date of Patent: Oct. 13, 2026

(54) INKJET PRINTING APPARATUS

(71) Applicant: Samsung Display Co., LTD., Yongin-si (KR)

(72) Inventors: Sang Hyung Lim, Cheonan-si (KR); Soon Mi Choi, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 169 days.

(21) Appl. No.: 18/597,738

(22) Filed: Mar. 6, 2024

(65) Prior Publication Data

US 2024/0208221 A1 Jun. 27, 2024

Related U.S. Application Data

(62) Division of application No. 17/447,180, filed on Sep. 8, 2021, now Pat. No. 11,951,741.

(30) Foreign Application Priority Data

Oct. 13, 2020 (KR) ........................ 10-2020-0131945

(51) Int. Cl.
*B41J 2/14* (2006.01)

(52) U.S. Cl.
CPC .................................. *B41J 2/1433* (2013.01)

(58) Field of Classification Search
CPC ......... B41J 2/1433; B41J 2/211; B41J 2/2107
See application file for complete search history.

(56) References Cited

U.S. PATENT DOCUMENTS 6,030,065 A 2/2000 Fukuhata
7,784,904 B2 8/2010 Ide et al.
12,004,412 B2 6/2024 Jeong et al.
2008/0158304 A1 7/2008 Eto
2010/0103233 A1* 4/2010 Akatsuka .................. B41J 2/19 347/92
2014/0168293 A1 6/2014 Moreau et al.
2017/0120587 A1 5/2017 Yamamoto et al.
2017/0282555 A1* 10/2017 De Meutter ........... B41J 2/1433

FOREIGN PATENT DOCUMENTS

CN 101376286 A 3/2009
JP H04163152 A 6/1992
JP 5276815 B2 8/2013
KR 2002-0025593 A 4/2002
KR 10-2012207 B1 8/2019
KR 20200034897 A 4/2020

OTHER PUBLICATIONS

Chinese Office Action issued May 16, 2025, in corresponding CN Patent Application No. CN 202111187003.7 (40 pages).

* cited by examiner

*Primary Examiner* — Jason S Uhlenhake

(74) *Attorney, Agent, or Firm* — Womble Bond Dickinson (US) LLP

(57) ABSTRACT

An inkjet apparatus comprises a stage, and an inkjet head positioned over the stage and including a plurality of nozzles through which ink including a plurality of particles is discharged. The inkjet head comprises a base portion constituting a main body of the inkjet head, a discharge portion adjacent to the base portion and including the plurality of nozzles, and an inner flow path between the base portion and the discharge portion and configured to accommodate the ink, wherein the base portion includes a first surface contacting the inner flow path, and at least a part of the first surface is at an incline.

3 Claims, 20 Drawing Sheets

700: 740, 750a, 750b, 750c, 750d

INKJET PRINTING APPARATUS

CROSS-REFERENCE TO RELATED APPLICATION

This application is a divisional of U.S. patent application Ser. No. 17/447,180, filed Sep. 8, 2021, which claims priority to and the benefit of Korean Patent Application No. 10-2020-0131945, filed on Oct. 13, 2020, in the Korean Intellectual Property Office, the entire content of which is incorporated herein by reference.

BACKGROUND

1. Field

One or more embodiments of the present disclosure relate to an inkjet printing apparatus.

2. Description of the Related Art

Display devices are becoming increasingly important with the development of multimedia. Accordingly, various display devices, such as organic light emitting displays and/or liquid crystal displays, are being used.

A display device is a device for displaying an image and includes a display panel such as an organic light emitting display panel and/or a liquid crystal display panel. As a light emitting display panel, the display panel may include light emitting elements such as light emitting diodes (LEDs). For example, the LEDs may be organic light emitting diodes (OLEDs) using (e.g., utilizing) an organic material as a light emitting material, or may be inorganic LEDs using (e.g., utilizing) an inorganic material as the light emitting material.

For example, in order to form an organic material layer included in a display device or to form an inorganic light emitting diode, an inkjet printing device may be used. After printing any ink or solution through inkjet printing, a post-treatment process may be performed to transfer an inorganic light emitting diode or to form an organic material layer. In an inkjet printing apparatus, a set or predetermined ink or solution may be supplied to an inkjet head, and the inkjet head may perform a process of spraying the ink or solution onto a substrate to be processed (for example, a target substrate).

SUMMARY

One or more aspects of embodiments of the disclosure is to provide an inkjet printing apparatus for reducing or preventing the precipitation of particles remaining in a print head unit, thereby making the number of particles in the ink uniform (or substantially uniform).

One or more aspects of embodiments of the disclosure is to provide an inkjet printing apparatus capable of reducing or preventing the occurrence of spots due to a difference in luminance of a display device.

According to one or more embodiments of the disclosure, the inkjet printing apparatus, comprises a stage, and an inkjet head over the stage and including a plurality of nozzles through which ink including a plurality of particles is discharged, wherein the inkjet head comprises a base portion constituting a main body of the inkjet head, a discharge portion adjacent to the base portion and including the plurality of nozzles, and an inner flow path between the base portion and the discharge portion and configured to accommodate the ink, wherein the base portion includes a first surface contacting the inner flow path, and at least a part of the first surface is at an incline.

In one or more embodiments, a first distance from one point of the first surface of the base portion to the discharge portion is longer than a second distance from another point of the first surface to the discharge portion.

In one or more embodiments, the inkjet head further includes an inlet through which the ink is supplied and an outlet through which the ink discharged, the inlet and the outlet being in the inner flow path, and the first distance is adjacent to the inlet, and the second distance is adjacent to the outlet.

In one or more embodiments, the second distance is about 90% to about 99% of the first distance.

In one or more embodiments, a distance between the first surface and the discharge portion gradually decreases from one end of the first surface of the base portion toward another end thereof.

In one or more embodiments, the plurality of nozzles include a first nozzle adjacent to the inlet and a second nozzle adjacent to the outlet, and a diameter of the first nozzle is larger than a diameter of the second nozzle.

In one or more embodiments, the diameter of the second nozzle is about 90% to about 99% of the diameter of the first nozzle.

In one or more embodiments, the plurality of nozzles further include a third nozzle between the first nozzle and the second nozzle, the third nozzle being adjacent to the second nozzle, and a diameter of the third nozzle is larger than the diameter of the second nozzle and is smaller than the diameter of the first nozzle.

In one or more embodiments, a diameter of a portion of the inner flow path adjacent to the outlet is smaller than a diameter of a portion of the inner flow path adjacent to the inlet.

In one or more embodiments, a diameter of the inner flow path gradually decreases from the inlet toward the outlet.

According to one or more embodiments of the disclosure, the inkjet printing apparatus, comprises a stage, and an inkjet head over the stage and including a plurality of nozzles through which ink including a plurality of particles is discharged, wherein the inkjet head includes a base portion constituting a main body of the inkjet head, a discharge portion adjacent to the base portion and including the plurality of nozzles, an inner flow path between the base portion and the discharge portion and configured to accommodate the ink is supplied, and at least one rotation member to rotate in the inner flow path to mix the ink.

In one or more embodiments, the rotation member includes a rotation shaft coupled to the base portion, and a blade coupled to the rotation shaft and configured to rotate in one direction.

In one or more embodiments, a length of the blade is shorter than a distance from the rotation shaft to one side surface of the base portion.

In one or more embodiments, the plurality of rotation members are provided, and a plurality of rotation members include a first rotation member and a second rotation member smaller than the first rotation member.

In one or more embodiments, the first rotation member is at a center of the base portion, and the second rotation member is in at least one corner of the base portion.

According to one or more embodiments of the disclosure, the inkjet printing apparatus, comprises a stage, and an inkjet head over the stage and including a plurality of nozzles through which ink including a plurality of particles is discharged, wherein the inkjet head comprises a base portion constituting a main body of the inkjet head, a discharge portion adjacent to the base portion and including the plurality of nozzles, an inner flow path between the base portion and the discharge portion and configured to accommodate the ink is supplied, and a sidewall portion adjacent to the base portion with the inner flow path therebetween, the sidewall portion being a sidewall of the inner flow path, wherein the sidewall portion includes a precipitation prevention member on at least one surface thereof, the precipitation prevention member being configured to fluidize the plurality of particles dispersed in the ink.

In one or more embodiments, the inkjet head further includes an inlet through which the ink is supplied and an outlet through which the ink discharged, the inlet and the outlet being in the inner flow path, and the sidewall portion includes a first sidewall portion extending from the discharge portion and contacting the inlet and a second sidewall portion extending from the discharge portion and contacting the outlet.

In one or more embodiments, the precipitation prevention member is in at least one selected from the first sidewall portion and the second sidewall portion, and a part of the precipitation prevention member is exposed to the inner flow path.

In one or more embodiments, the precipitation prevention member includes an ultrasonic vibrator.

In one or more embodiments, the precipitation prevention member includes a charging plate to which a voltage is configured to be applied.

However, aspects of the disclosure are not restricted to the one set forth herein. The above and other aspects of the disclosure will become more apparent to one of ordinary skill in the art to which the disclosure pertains by referencing the detailed description of the disclosure given below.

BRIEF DESCRIPTION OF THE DRAWINGS

The above and other aspects and features of the disclosure will become more apparent by describing in more detail embodiments thereof with reference to the attached drawings, in which.

DETAILED DESCRIPTION

Figure 1:
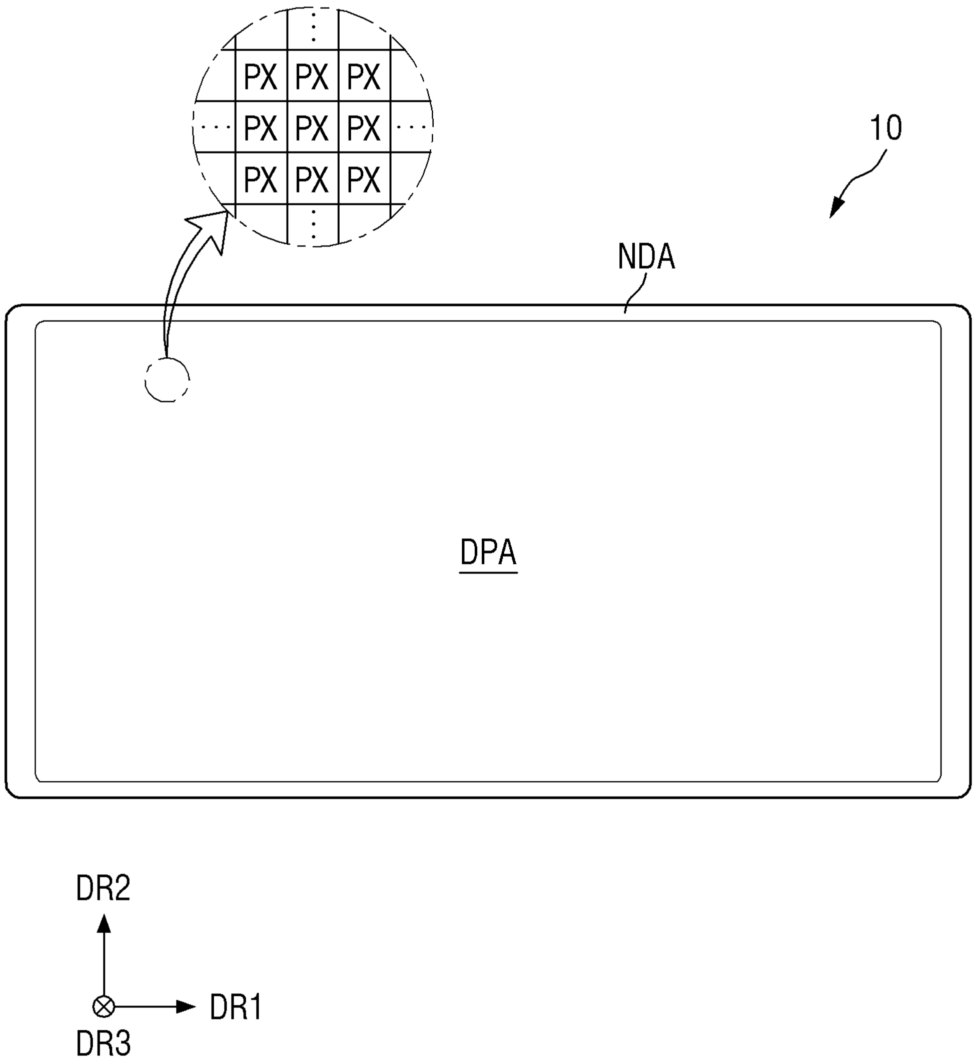
FIG. 1 is a schematic plan view of a display device according to one or more embodiments.

The present disclosure will now be described more fully hereinafter with reference to the accompanying drawings, in which embodiments of the disclosure are shown. This disclosure may, however, be embodied in different forms and should not be construed as limited to the embodiments set forth herein. Rather, these embodiments are provided so that this disclosure will be thorough and complete, and will filly convey the scope of the disclosure to those skilled in the art.

It will also be understood that when a layer is referred to as being "on" another layer or substrate, it can be directly on the other layer or substrate (e.g., without any intervening layers therebetween), or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

As used herein, the singular forms "a," "an," and "the" are intended to include the plural forms as well, unless the context clearly indicates otherwise.

It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the terms "use," "using," and "used" may be considered synonymous with the terms "utilize," "utilizing," and "utilized," respectively.

As used herein, expressions such as "at least one of", "one of", and "selected from", when preceding a list of elements, modify the entire list of elements and do not modify the individual elements of the list.

As used herein, the term "and/or" includes any and all combinations of one or more of the associated listed items.

Further, the use of "may" when describing embodiments of the present disclosure refers to "one or more embodiments of the present disclosure".

As used herein, the terms "substantially", "about", and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Hereinafter, embodiments of the disclosure will be described with reference to the attached drawings.

FIG. 1 is a schematic plan view of a display device according to one or more embodiments.

Referring to FIG. 1, a display device 10 displays a mobile (e.g., moving) image or a still image. The display device 10 may refer to any electronic device that provides a display screen. For example, the display device 10 may be used in televisions, notebooks, monitors, billboards, internet of things, mobile phones, smart phones, tablet personal computers (PCs), electronic watches, smart watches, watch phones, head mounted displays, mobile communication terminals, electronic notebooks, electronic books, portable multimedia players (PMPs), navigators, game machines, digital cameras, camcorder, and/or the like.

The display device 10 includes a display panel for providing a display screen. Examples of the display panel may include an inorganic light emitting diode display panel, an organic light emitting display panel, a quantum dot light emitting display panel, a plasma display panel, and a field emission display panel. Hereinafter, there will be exemplified a case where an inorganic light emitting diode display panel is used as the display panel, but the disclosure is not limited thereto. Any suitable display panel may be used as the display panel as long as the same technical idea is applicable.

In the drawings illustrating the display device 10, a first direction DR1, a second direction DR2, and a third direction DR3 are defined. The first direction DR1 and the second direction DR2 may be directions perpendicular (e.g., substantially perpendicular) to each other in one plane. The third direction DR3 may be a direction perpendicular (e.g., substantially perpendicular) to a plane in which the first direction DR1 and the second direction DR2 are positioned. The third direction DR3 is perpendicular (e.g., substantially perpendicular) to each of the first direction DR1 and the second direction DR2. In one or more embodiments explaining the display device 10, the third direction DR3 refers to a thickness direction of the display device 10.

The shape of the display device 10 may be variously suitably modified. For example, the display device 10 may have a rectangular shape including sides in the first direction DR1 longer than sides in the second direction DR2 in a plan view. For another example, the display device 10 may have a rectangular shape including sides in the second direction DR2 longer than sides in the first direction DR1 in a plan view. However, the disclosure is not limited thereto, and the display device may have a shape such as a square, a rectangle having round corners (vertexes), another polygon, and/or a circle, without limitation. The shape of a display area DPA of the display device 10 may also be similar to the overall shape of the display device 10. FIG. 1 illustrates a display device 10 and a display area DPA each having a rectangular shape including sides in the first direction DR1 longer than sides in the second direction DR2.

The display device 10 may include a display area DPA and a non-display area NDA. The display area DPA is an area where an image is displayed, and the non-display area NDA is an area where an image is not displayed. The display area DPA may be referred to as an active area, and the non-display area NDA may be referred to as an inactive area. The display area DPA may generally occupy the center of the display device 10.

The display area DPA may include a plurality of pixels PX. The plurality of pixels PX may be arranged in a matrix direction (e.g., matrix formation). Each of the pixels PX may have a rectangular shape or a square shape in a plan view, but the shape thereof is not limited thereto. For example, each of the pixels PX may have a rhombus shape in which each side is inclined with respect to one direction. The respective pixels PX may be alternately arranged in a stripe pattern or a PenTile®/PENTILE® fashion or pattern (PENTILE® is a registered trademark owned by Samsung Display Co., Ltd.). Each of the pixels PX includes at least one light emitting element 30 emitting (e.g., configured to emit) light of a set or specific wavelength band to display a set or specific color.

The non-display area NDA may be around the display area DPA. The non-display area NDA may entirely or partially surround the display area DPA. The display area DPA may have a rectangular shape, and the non-display area NDA may be adjacent to four sides of the display area DPA. The non-display area NDA may constitute a bezel of the display device 10. Wirings and/or circuit drivers included in the display device 10 may be positioned in the non-display area NDA, and/or external devices may be mounted in the non-display area NDA.

Figure 2:
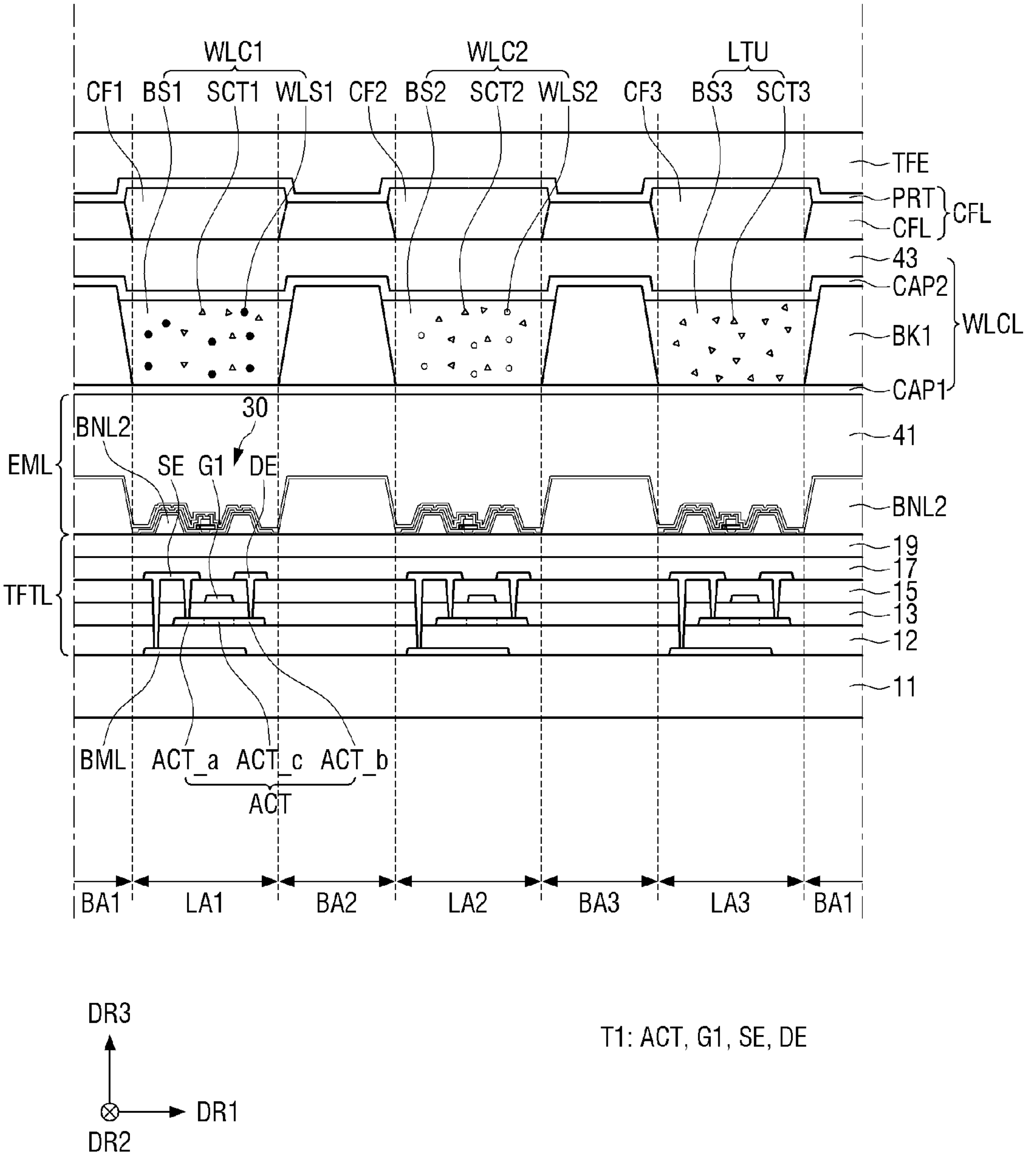
FIG. 2 is a schematic cross-sectional view illustrating some sub-pixels of a display device according to one or more embodiments.

FIG. 2 is a schematic cross-sectional view illustrating some sub-pixels of a display device according to one or more embodiments.

Referring to FIG. 2, the display area DPA of the display device 10 may include first to third light emission areas LA1, LA2, and LA3. Each of the first to third light emission areas LA1, LA2, and LA3 may be an area in which light generated from the light emitting element 30 of the display device 10 is emitted to the outside of the display device 10.

The display device 10 may include a substrate 11, a buffer layer 12, a transistor layer TFTL, a light emitting element layer EML, a wavelength conversion layer WLCL, a color filter layer CFL, and an encapsulation layer TFE.

The substrate 11 may be a base substrate or a base member, and may be made of an insulating material such as a polymer resin. For example, the substrate 11 may be a flexible substrate capable of bending, folding, rolling, and/or the like. The substrate 11 may include polyimide (PI), but the material thereof is not limited thereto.

The buffer layer 12 may be on the substrate 11. The buffer layer 12 may be formed of an inorganic layer capable of reducing or preventing the penetration of air and/or moisture. For example, the buffer layer 12 may include a plurality of inorganic layers alternately stacked.

The transistor layer TFTL may be on the buffer layer 12. The transistor layer TFTL may include a first transistor T1, a first gate insulating layer 13, a first interlayer insulating layer 15, a second interlayer insulating layer 17, and a first planarization layer 19.

The first transistor T1 may be on the buffer layer BF, and may constitute a pixel circuit of each of a plurality of pixels. For example, the first transistor T1 may be a driving transistor or a switching transistor of a pixel circuit. The first transistor T1 may include an active layer ACT, a gate electrode G1, a source electrode SE, and a drain electrode DE. The active layer ACT may include a plurality of conducting regions ACT_a and ACT_b and a channel region ACT_c therebetween.

The light emitting element layer EML may be on the transistor layer TFTL. The light emitting element layer EML may include a first bank BNL1, a light emitting element 30, and a second bank BNL2. The light emitting element 30 may be on the first transistor T1. The light emitting element 30 may be between a first electrode and a second electrode, and may be connected (e.g., coupled) to a first contact electrode and a second contact electrode, respectively.

Details of the aforementioned transistor layer TFTL and light emitting element layer EML will be described hereinbelow with reference to FIGS. 3 to 5.

A second planarization layer 41 may be on the light emitting element layer EML to planarize the upper end of the light emitting element layer EML. The second planarization layer 41 may include an organic material. For example, the second planarization layer 41 may include at least one selected from the group consisting of acrylic resin, epoxy resin, phenolic resin, polyamide resin, and polyimide resin.

The wavelength conversion layer WLCL may include a first capping layer CAP1, a first light blocking member BK1, a first wavelength conversion part WLC1, a second wavelength conversion part WLC2, a light transmission part LTU, a second capping layer CAP2, and a third planarization layer 43.

The first capping layer CAP1 may be on the second planarization layer 41 of the light emitting element layer EML. The first capping layer CAP1 may seal the lower surfaces of the first and second wavelength conversion parts WLC1 and WLC2 and the light transmission part LTU. The first capping layer CAP1 may include an inorganic material. For example, the first capping layer CAP1 may include at least one selected from the group consisting of silicon nitride, aluminum nitride, zirconium nitride, titanium nitride, hafnium nitride, tantalum nitride, silicon oxide, aluminum oxide, titanium oxide, tin oxide, cerium oxide, and silicon oxynitride.

The first light blocking member BK1 may be provided in first to third light blocking areas BA1, BA2, and BA3 on the first capping layer CAP1. The first light blocking member BK1 may overlap the second bank BNL2 in the thickness direction. The first light blocking member BK1 may reduce or block the transmission of light. The first light blocking member BK1 may reduce or prevent the invasion of light and color-mixing between the first to third light emission areas LA1, LA2, and LA3, thereby improving color reproducibility. The first light blocking member BK1 may be in a lattice shape surrounding the first to third light emission areas LA1, LA2, and LA3 in a plan view.

The first light blocking member BK1 may include an organic light blocking material and a liquid-repellent component. Here, the liquid-repellent component may be made of a fluorine-containing monomer or a fluorine-containing polymer, and for example, may include a fluorine-containing aliphatic polycarbonate. For example, the first light blocking member BK1 may be made of a black organic material including a liquid-repellent component. The first light blocking member BK1 may be formed through a coating and exposure process of an organic light blocking material including a liquid-repellent component.

Because the first light blocking member BK1 includes a liquid repellent component, the first and second wavelength conversion parts WLC1 and WLC2 and the light transmission part LTU may be separated into the corresponding light emission area LA. For example, when the first and second wavelength conversion parts WLC1 and WLC2 and the light transmission part LTU are formed by an inkjet method, an ink composition may flow on the upper surface of the first light blocking member BK1. In this case, the first light blocking member BK1 includes a liquid-repellent component, so that the ink composition may flow into each light emission area. Accordingly, the first light blocking member BK1 may reduce or prevent a mixture (e.g., an undesirable mixture) of the ink composition(s).

The first wavelength conversion part WLC1 may be in the first light emission area LA1 on the first capping layer CAP1. The first wavelength conversion part WLC1 may be surrounded by the first light blocking member BK1. The first wavelength conversion part WLC1 may include a first base resin BS1, a first scatterer SCT1, and a first wavelength shifter WLS1.

The first base resin BS1 may include a material having relatively high light transmittance. The first base resin BS1 may be made of a transparent organic material. For example, the first base resin BS1 may include at least one of organic materials such as an epoxy resin, an acrylic resin, a cardo resin, and/or an imide resin.

The first scatterer SCT1 may have a different refractive index from the first base resin BS1, and may form an optical interface with the first base resin BS1. For example, the first scatterer SCT1 may include a light scattering material and/or light scattering particles that scatter at least a part of transmitted light. For example, the first scatterer SCT1 may include metal oxide particles such as titanium oxide ($TiO_2$) particles, zirconium oxide ($ZrO_2$) particles, aluminum oxide ($Al_2O_3$) particles, indium oxide ($In_2O_3$) particles, zinc oxide (ZnO) particles, and/or tin oxide ($SnO_2$) particles, or may include organic particles such as acrylic resin particles and/or urethane resin particles. The first scatterer SCT1 may scatter light in a random direction regardless of the incident direction of incident light, without substantially converting the peak wavelength of the incident light.

The first wavelength shifter WLS1 may convert or shift a peak wavelength of incident light into a first peak wavelength. For example, the first wavelength shifter WLS1 may convert blue light provided from the display device 10 into red light having a single peak wavelength in the range of 610 nm to 650 nm and emit the red light. The first wavelength shifter WLS1 may be a quantum dot, a quantum rod, or a phosphor. The quantum dot may be particulate matter that emits light of a set or specific color as electrons transition from a conduction band to a valence band.

For example, the quantum dot may be a semiconductor nanocrystalline material. The quantum dot may have a specific band gap according to its composition and size, absorb light, and then emit light having a unique wavelength. Examples of semiconductor nanocrystals of the quantum dot include Group IV nanocrystals, Groups II-VI compound nanocrystals, Groups III-V compound nanocrystals, Groups IV-VI compound nanocrystals, and combinations thereof.

For example, the quantum dots may have a core-shell structure including a core including the above-described nanocrystal and a shell surrounding the core. The shell of the quantum dot may serve as a protective layer for maintaining semiconductor characteristics by reducing or preventing the chemical modification of the core, and may serve as a charging layer for imparting electrophoretic characteristics to the quantum dot. The shell may be a single layer or multiple layers. The interface between the core and the shell may have a concentration gradient in which the concentration of an element in the shell decreases toward the center. The shell of the quantum dot may be made of a metal oxide, a non-metal oxide, a semiconductor compound, or a combination thereof.

Light emitted by the first wavelength shifter WLS1 may have a full width of half maximum (FWHM) of light emission wavelength spectrum of 45 nm or less, 40 nm or less, or 30 nm or less, and may further improve the color purity and color reproducibility of a color displayed by the display device 10. The light emitted by the first wavelength shifter WLS1 may be emitted in various directions regardless of the incident direction of incident light. Accordingly, the side visibility of a red color displayed in the first light emission area LA1 may be improved.

A part of the blue light provided from the light emitting element layer EML may be transmitted through the first wavelength conversion part WLC1 without being converted into red light by the first wavelength shifter WLS1. In the blue light provided from the light emitting element layer EML, light incident on the first color filter CF1 that hasn't been converted by the first wavelength converter WLC1 may be blocked by the first color filter CF1. Further, from the blue light provided from the light emitting element layer EML, the red light converted by the first wavelength conversion part WLC1 may be transmitted through the first color filter CF1 and be emitted to the outside.

The second wavelength conversion part WLC2 may be in the second light emission area LA2 on the first capping layer CAP1. The second wavelength conversion part WLC2 may be surrounded by the first light blocking member BK1. The second wavelength conversion part WLC2 may include a second base resin BS2, a second scatterer SCT2, and a second wavelength shifter WLS2.

The second base resin BS2 may include a material having relatively high light transmittance. The second base resin BS2 may be made of a transparent organic material. For example, the second base resin BS2 may be made of the same material as the first base resin BS1, or may be made of the material exemplified in the description of the first base resin BS1.

The second scatterer SCT2 may have a different refractive index from the second base resin BS2, and may form an optical interface with the second base resin BS2. For example, the second scatterer SCT2 may include a light scattering material and/or light scattering particles that scatter at least a part of transmitted light. For example, the second scatterer SCT2 may be made of the same material as the first scatterer SCT1, or may be made of the material exemplified in the description of the first scatterer SCT1. The second scatterer SCT2 may scatter light in a random direction regardless of the incident direction of incident light, without substantially converting the peak wavelength of the incident light.

The second wavelength shifter WLS2 may convert or shift the peak wavelength of incident light into a second peak wavelength different from the first peak wavelength. For example, the second wavelength shifter WLS2 may convert blue light provided from the display device 10 into green light having a single peak wavelength in the range of 510 nm to 550 nm and emit the green light. The second wavelength shifter WLS2 may be a quantum dot, a quantum rod, or a phosphor. The second wavelength shifter WLS2 may include the same material as the material exemplified in the description of the first wavelength shifter WLS1. The second wavelength shifter WLS2 may be made of a quantum dot, a quantum rod, or a phosphor such that the wavelength conversion range of the second wavelength shifter WLS2 is different from the wavelength conversion range of the first wavelength shifter WLS1.

The light transmission part LTU may be in the third light emission area LA3 on the first capping layer CAP1. The light transmission part LTU may be surrounded by the first light blocking member BK1. The light transmission part LTU may transmit incident light by maintaining the peak wavelength thereof. The light transmission part LTU may include a third base resin BS3 and a third scatterer SCT3.

The third base resin BS3 may include a material having relatively high light transmittance. The third base resin BS3 may be made of a transparent organic material. For example, the third base resin BS3 may be made of the same material as the first and/or second base resin BS1 or BS2, or may be made of the material exemplified in the description of the first and/or second base resin BS1 or BS2.

The third scatterer SCT3 may have a different refractive index from the third base resin BS3, and may form an optical interface with the third base resin BS3. For example, the third scatterer SCT3 may include a light scattering material and/or light scattering particles that scatter at least a part of transmitted light. For example, the third scatterer SCT3 may be made of the same material as the first and/or second scatterer SCT1 or SCT3, or may be made of the material exemplified in the description of the first and/or second scatterer SCT1 or SCT3. The third scatterer SCT3 may scatter light in a random direction regardless of the incident direction of incident light without substantially converting the peak wavelength of the incident light.

Because the wavelength conversion layer WLCL is directly on the second planarization layer 41 of the light emitting element layer EML, the display device 10 may not need a separate substrate for the first and second wavelength conversion parts WLC1 and WLC2 and the light transmission part LTU. Accordingly, the first and second wavelength conversion parts WLC1 and WLC2 and the light transmission part LTU may be easily aligned to each of the first to third light emission areas LA1, LA2, and LA3, and the thickness of the display device 10 may be relatively reduced.

The second capping layer CAP2 may cover the first and second wavelength conversion parts WLC1 and WLC2, the light transmission part LTU, and the first light blocking member BK1. For example, the second capping layer CAP2 may seal the first and second wavelength conversion parts WLC1 and WLC2 and the light transmission part LTU to reduce or prevent the damage and/or contamination of the first and second wavelength conversion parts WLC1 and WLC2 and the light transmission part. The second capping layer CAP2 may be made of the same material as the first capping layer CAP1, or may be made of the material exemplified in the description of the first capping layer CAP1.

The third planarization layer 43 may be on the second capping layer CAP2 to planarize the upper ends of the first and second wavelength converters WLC1 and WLC2 and the light transmission part LTU. The third planarization layer 43 may include an organic material. For example, the third planarization layer 43 may include at least one selected from the group consisting of acrylic resin, epoxy resin, phenolic resin, polyamide resin, and polyimide resin.

The color filter layer CFL may include a second light blocking member BK2, first to third color filters CF1, CF2, and CF3, and a protective layer PRT.

The second light blocking member BK2 may be in first to third light blocking areas BA1, BA2, and BA3 on the third planarization layer 43 of the wavelength conversion layer WLCL. The second light blocking member BK2 may overlap the first blocking member BK1 and/or the second bank BNL2 in the thickness direction. The second light blocking member BK2 may reduce or block the transmission of light. The second light blocking member BK2 may reduce or prevent the invasion of light and color-mixing between the first to third light emission areas LA1, LA2, and LA3, thereby improving color reproducibility. The second light blocking member BK2 may be in a lattice shape surrounding the first to third light emission areas LA1, LA2, and LA3 in a plan view.

The first color filter CF1 may be in the first light emission area LA1 on the third planarization layer 43. The first color filter CF1 may be surrounded by the second light blocking member BK2. The first color filter CF1 may overlap the first wavelength conversion part WLC1 in the thickness direction. The first color filter CF1 may selectively transmit light of a first color (for example, red light), and may block, absorb, or reduce light of a second color (for example, green light) and light of a third color (for example, blue light). For example, the first color filter CF1 may be a red color filter, and may include a red colorant. The red colorant may be made of a red dye or a red pigment.

The second color filter CF2 may be in the second light emission area LA2 on the third planarization layer 43. The second color filter CF2 may be surrounded by the second light blocking member BK2. The second color filter CF2 may overlap the second wavelength conversion part WLC2 in the thickness direction. The second color filter CF2 may selectively transmit light of a second color (for example, green light), and may block, absorb, or reduce light of a first color (for example, red light) and light of a third color (for example, blue light). For example, the second color filter CF2 may be a green color filter, and may include a green colorant. The green colorant may be made of a green dye or a green pigment.

The third color filter CF3 may be in the third light emission area LA3 on the third planarization layer 43. The third color filter CF3 may be surrounded by the second light blocking member BK2. The third color filter CF3 may overlap the light transmission part LTU in the thickness direction. The third color filter CF3 may selectively transmit light of a third color (for example, blue light), and may block, absorb, or reduce light of a first color (for example, red light) and light of a second color (for example, green light). For example, the third color filter CF3 may be a blue color filter, and may include a blue colorant. The blue colorant may be made of a blue dye or a blue pigment.

The first to third color filters CF1, CF2, and CF3 may absorb a part of the light incident from the outside of the display device 10 to reduce reflected light caused by external light. Accordingly, the first to third color filters CF1, CF2, and CF3 may reduce or prevent color distortion due to the reflection of external light.

The first to third color filters CF1, CF2, and CF3 are directly on the third planarization layer 43 of the wavelength conversion layer WLCL, so that the display device 10 may not need a separate substrate for the first to third color filters CF1, CF2, and CF3. Accordingly, the thickness of the display device 10 may be relatively reduced.

The third protective layer PRT may cover the first to third color filters CF1, CF2, and CF3. The third protective layer PRT may protect the first to third color filters CF1, CF2, and CF3.

The encapsulation layer TFE may be on the third protective layer PRT of the color filter layer CFL. The encapsulation layer TFE may cover the upper and side surfaces of a display layer. For example, the encapsulation layer TFE may include at least one inorganic layer to reduce or prevent the penetration of oxygen and/or moisture. Further, the encapsulation layer TFE may include at least one organic layer to protect the display device 10 from foreign matter such as dust.

Hereinafter, the transistor layer TFTL and the light emitting element layer EML will be described in more detail through the planar and cross-sectional structures of one pixel of the display device according to one or more embodiments.

Figure 3:
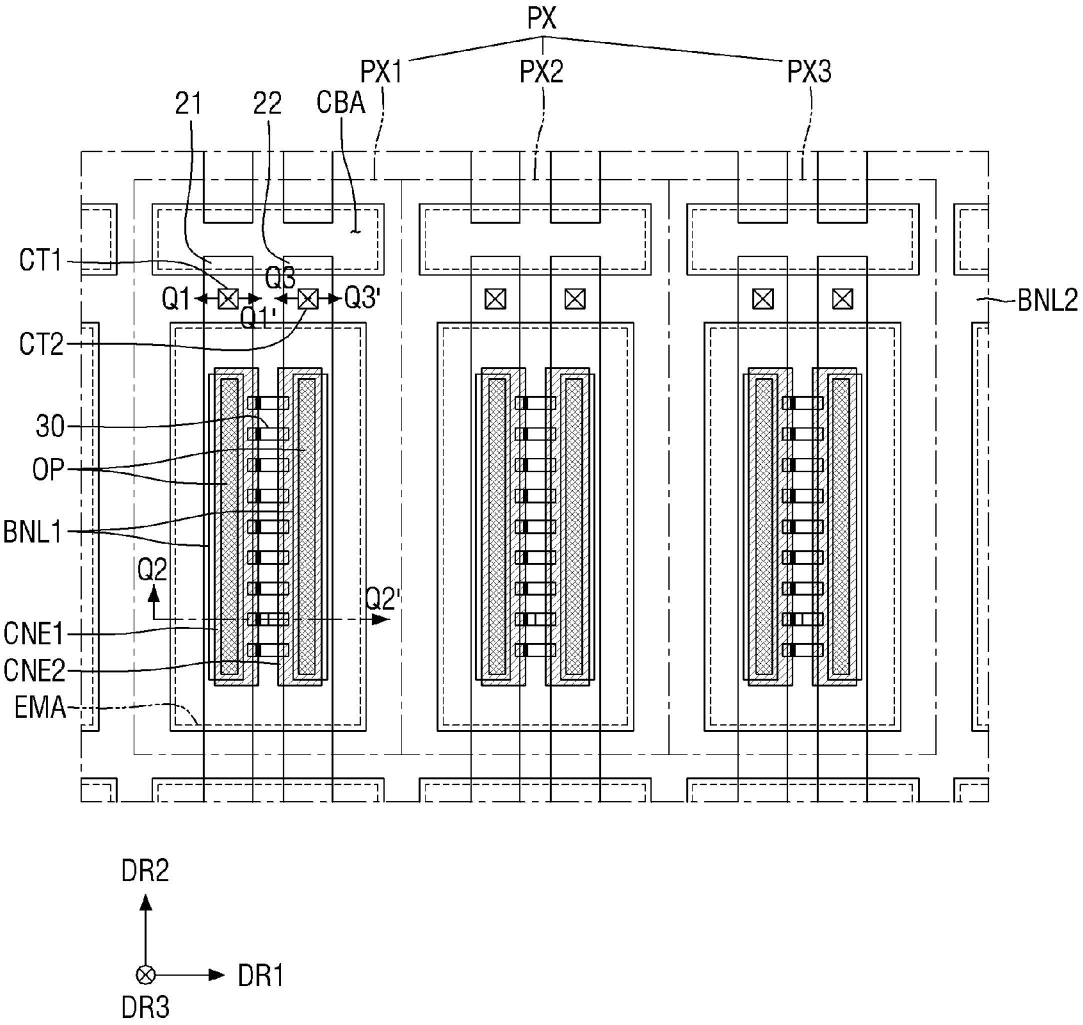
FIG. 3 is a plan view illustrating one pixel of a display device according to one or more embodiments.

FIG. 3 is a plan view illustrating one pixel of a display device according to one or more embodiments.

Referring to FIG. 3, each of the plurality of pixels PX may include a plurality of sub-pixels PXn (n is an integer of 1 to 3). For example, one pixel PX may include a first sub-pixel PX1, a second sub-pixel PX2, and a third sub-pixel PX3. The first sub-pixel PX1 may emit light of a first color, the second sub-pixel PX2 may emit light of a second color, and the third sub-pixel PX3 may emit light of a third color. For example, the first color may be blue, the second color may be green, and the third color may be red. However, the disclosure is not limited thereto, and each of the sub-pixels PXn may emit light of the same color. Although it is shown in FIG. 3 that the pixel PX includes three sub-pixels PXn, the disclosure is not limited thereto, and the pixel PX may include a larger number of sub-pixels PXn.

Each of the sub-pixels PXn of the display device 10 may include a light emission area EMA and a non-light emission area. The light emission area EMA is defined as an area in which a light emitting element 30 is positioned to emit light of a set or specific wavelength band, and the non-light emission area is defined as an area in which no light emitting element 30 is provided, and no light is emitted. The light emission area EMA may include an area in which the light emitting element 30 is positioned, and an area adjacent to the light emitting element 30 to discharge light emitted from the light emitting element 30.

However, the disclosure is not limited thereto, and the light emission area EMA may also include an area in which light emitted from the light emitting element 30 is reflected or refracted by another member and then emitted. The plurality of light emitting elements 30 may be arranged in each of the sub-pixels PXn, and the light emission area may be formed by (e.g., to include) an area in which the plurality of light emitting elements 30 are arranged and an area adjacent to this area.

Each of the sub-pixels PXn may include a cut area CBA in the non-light emission area. The cut area CBA may be at one side of the light emission area EMA in the second direction DR2. The cut area CBA may be between the light emission areas EMA of the adjacent sub-pixels PXn in the second direction DR2. A plurality of light emission areas EMA and a plurality of cut areas CBA may be arranged in the display area DPA of the display device 10. For example, the plurality of light emission areas EMA and the plurality of cut area CBA are repeatedly arranged in the first direction DR1, respectively, and may be alternately arranged in the second direction DR2. The distance between the cut areas CBA spaced apart from each other in the first direction DR1 may be smaller than the distance between the light emission areas EMA spaced apart from each other in the first direction DR1. The second bank BNL2 may be between the cut areas CBA and the light emission areas EMA, and the distance between them may vary according to the width of the second bank BNL2. Because the light emitting element 30 is not in the cut area CBA, light is not emitted, but a part of each of electrodes 21 and 22 positioned in each of the sub-pixels PXn may be in the cut area CBA. The electrodes 21 and 22 provided for each of the sub-pixels PXn may be separate from each other in the cut area CBA.

Figure 4:
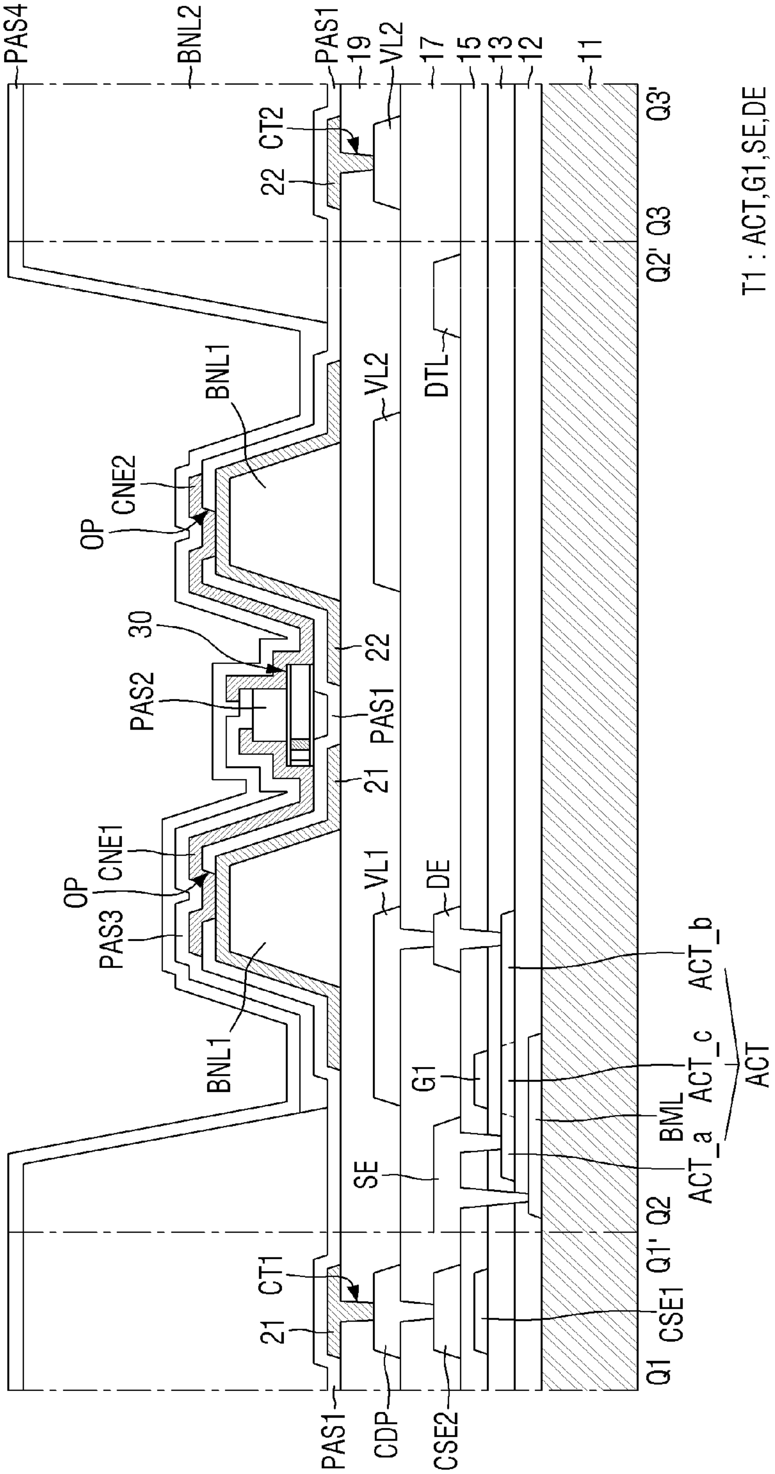
FIG. 4 is a cross-sectional view taken along the lines Q1-Q1', Q2-Q2', and Q3-Q3' of FIG. 3.

FIG. 4 is a cross-sectional view taken along the lines Q1-Q1', Q2-Q2', and Q3-Q3' of FIG. 3. FIG. 4 illustrates a cross-sectional view crossing both ends of the light emitting element 30 in the first sub-pixel PX1 of FIG. 3.

Figure 5:
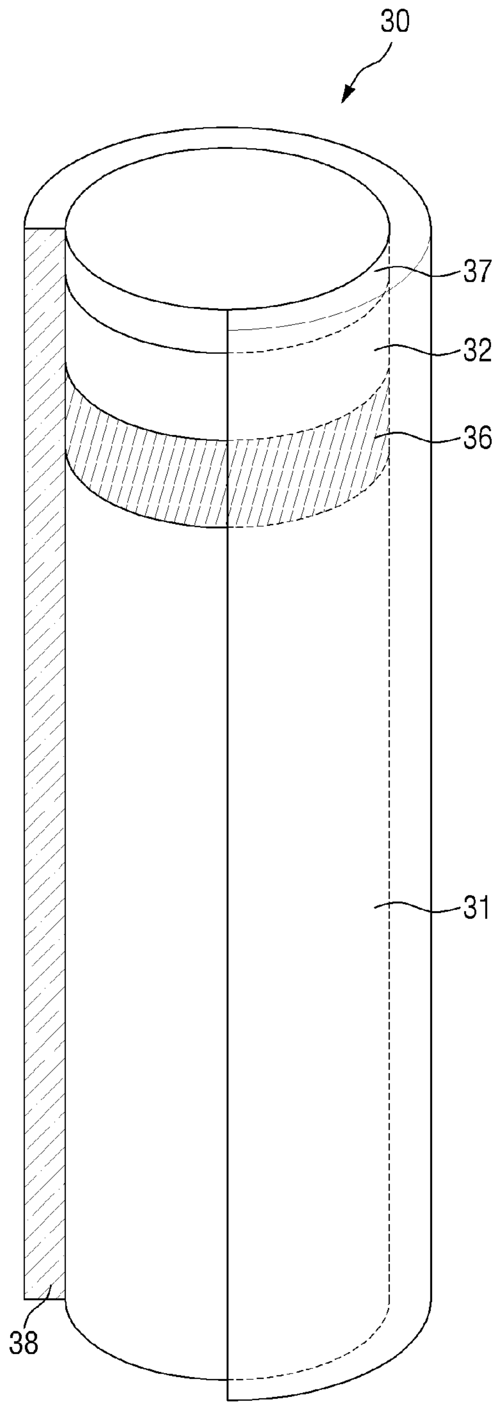
FIG. 5 is a schematic view of a light emitting element according to one or more embodiments.
Figure 6:
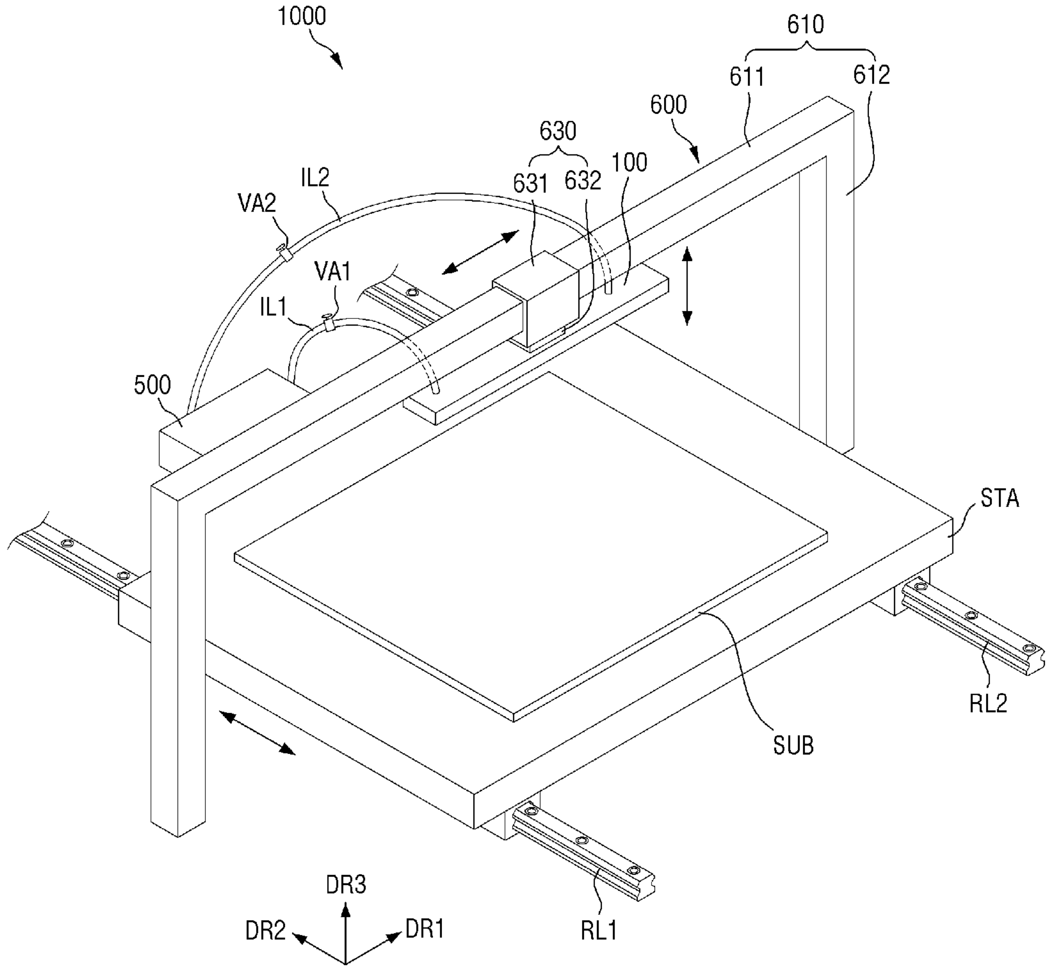
FIG. 6 is a schematic plan view of an inkjet printing apparatus according to one or more embodiments.

Referring to FIGS. 4 to 6 together with FIG. 3, the display device 10 may include a substrate 11, a semiconductor layer, a plurality of conductive layers, and a plurality of insulating layers, which are positioned on the substrate 11. The semiconductor layer, the conductive layers, and the insulating layers may constitute a circuit layer and a light emitting element layer of the display device 10, respectively.

A light blocking layer BML may be on the substrate 11. The light blocking layer BML may overlap an active layer ACT of a first transistor T1 of the display device 10. The light blocking layer BML may include a material reducing or blocking light, thereby reducing or preventing light from entering the active layer ACT of the first transistor. For example, the light blocking layer BML may be formed of an opaque metal material that reduces or blocks light transmission. However, the disclosure is not limited thereto, and in some cases, the light blocking layer BML may be omitted.

A buffer layer 12 may be entirely on the substrate 11 and the light blocking layer BML. The buffer layer 12 may be formed on the substrate 11 to protect the first transistors T1 of the pixel PX from moisture penetrating through the substrate 11, which is vulnerable to moisture permeation, and may perform a surface planarization function. The buffer layer 12 may be formed as a plurality of inorganic layers alternately stacked. For example, the buffer layer 12 may be formed to have a multi-layer structure in which inorganic layers including at least one selected from the group consisting of silicon oxide (SiOx), silicon nitride (SiNx), and silicon oxynitride (SiOxNy) are alternately stacked.

A semiconductor layer is on the buffer layer 12. The semiconductor layer may include the active layer ACT of the first transistor T1. The semiconductor layer and the buffer layer 12 may partially overlap a gate electrode G1 and/or the like of a first gate conductive layer to be described below.

Among the transistors included in the sub-pixel PXn of the display device 10, only the first transistor T1 is shown in the drawing, but the disclosure is not limited thereto. The display device 10 may include a larger number of transistors. For example, the display device 10 may include two or three transistors for each sub-pixel PXn, including one or more transistors in addition to the first transistor T1.

The semiconductor layer may include polycrystalline silicon, monocrystalline silicon, and/or oxide semiconductor. When the semiconductor layer includes an oxide semiconductor, each active layer ACT may include a plurality of conducting regions ACT_a and ACT_b and a channel region ACT_c therebetween. The oxide semiconductor may be an oxide semiconductor containing indium (In). For example, the oxide semiconductor may be indium-tin oxide (ITO), indium-zinc oxide (IZO), indium-gallium oxide (IGO), indium-zinc-tin oxide (IZTO), indium-gallium-tin oxide (IGTO), indium-gallium-zinc oxide (IGZO), and/or indium-gallium-zinc-tin oxide (IGZTO).

In one or more embodiments, the semiconductor layer may include polycrystalline silicon. Polycrystalline silicon may be formed by crystallizing amorphous silicon, and in this case, the conducting regions of the active layer ACT may be doped regions doped with impurities, respectively.

A first gate insulating layer 13 may be on the semiconductor layer and the buffer layer 12. The first gate insulating layer 13 may include the semiconductor layer and may be on the buffer layer 12. For example, the first gate insulating layer 13 may be on the buffer layer 12 in addition to the semiconductor layer. The first gate insulating layer 13 may function as a gate insulating layer of each transistor. The first gate insulating layer 13 may be formed of an inorganic layer including an inorganic material, such as silicon oxide (SiOx), silicon nitride (SiNx), and/or silicon oxynitride (SiOxNy), or may be formed as a stacked structure of the inorganic layers.

A first gate conductive layer is on the first gate insulating layer 13. The first gate conductive layer may include a gate electrode G1 of the first transistor T1 and a first capacitance electrode CSE1 of a storage capacitor. The gate electrode G1 may overlap the channel region ACT_c of the active layer ACT in the thickness direction. The first capacitance electrode CSE1 may overlap a second capacitance electrode CSE2 (to be described below) in the thickness direction. In one or more embodiments, the first capacitance electrode CSE1 may be integrally connected (e.g., may be integral) with the gate electrode G1. The first capacitance electrode CSE1 may overlap the second capacitance electrode CSE2 in the thickness direction, and the storage capacitor may be formed between the first capacitance electrode CSE1 and the second capacitance electrode CSE2.

The first gate conductive layer may be formed as a single layer or multiple layer including any one of molybdenum (Mo), aluminum (Al), chromium (Cr), gold (Au), titanium (Ti), nickel (Ni), neodymium (Nd), copper (Cu), or an alloy thereof. However, the disclosure is not limited thereto.

A first interlayer insulating layer 15 is on the first gate conductive layer. The first interlayer insulating layer 15 may function as an insulating layer between the first gate conductive layer and other layers positioned thereon. The first interlayer insulating layer 15 may cover the first gate conductive layer to perform a function of protecting the first gate conductive layer. The first interlayer insulating layer 15 may be formed of an inorganic layer including an inorganic material, such as silicon oxide (SiOx), silicon nitride (SiNx), and/or silicon oxynitride (SiOxNy), or may be formed as a stacked structure of the inorganic layers.

A first data conductive layer is on the first interlayer insulating layer 15. The first data conductive layer may include a first source electrode SE and a first drain electrode DE of the first transistor T1, a data line DTL, and a second capacitance electrode CSE2.

The first source electrode SE and first drain electrode DE of the first transistor T1 may contact the doped regions ACT_a and ACT_b of the active layer ACT through a contact hole penetrating the first interlayer insulating layer 15 and the first gate insulating layer 13, respectively. Further, the first source electrode SE of the first transistor T1 may be electrically connected (e.g., electrically coupled) to the light blocking layer BML through another contact hole.

The data line DTL may apply a data signal to another transistor included in the display device 10. For example, the data line DTL may be connected (e.g., coupled) to a source/drain electrode of another transistor to transmit a signal applied from the data line DTL.

The second capacitance electrode CSE2 may overlap the first capacitance electrode CSE1 in the thickness direction. In one or more embodiments, the second capacitance electrode CSE2 may be integrally connected (e.g., may be integral) with the first source electrode SE.

The first data conductive layer may be formed as a single layer or multiple layers including any one of molybdenum (Mo), aluminum (Al), chromium (Cr), gold (Au), titanium (Ti), nickel (Ni), neodymium (Nd), copper (Cu), or an alloy thereof. However, the disclosure is not limited thereto.

A second interlayer insulating layer 17 is on the first data conductive layer. The second interlayer insulating layer 17 may function as an insulating layer between the first data conductive layer and other layers positioned thereon. The second interlayer insulating layer 17 may cover the first data conductive layer to perform a function of protecting the first data conductive layer. The second interlayer insulating layer 17 may be formed of an inorganic layer including an inorganic material, such as silicon oxide (SiOx), silicon nitride (SiNx), and/or silicon oxynitride (SiOxNy), or may be formed as a stacked structure of the inorganic layers.

A second data conductive layer is on the second interlayer insulating layer 17. The second data conductive layer may include a first voltage line VL1, a second voltage line VL2, and a first conductive pattern CDP. A high-potential voltage (or a first power voltage) supplied to the first transistor T1 may be applied to first voltage line VL1, and a low-potential voltage (or a second power voltage) supplied to the second electrode 22 (which may also be referred to herein as "second alignment electrode 22") may be applied to the second voltage line VL2. During the process of manufacturing the display device 10, an alignment signal to align the light emitting elements 30 may be applied to the second voltage line VL2.

The first conductive pattern CDP may be connected (e.g., coupled) to the second capacitance electrode CSE2 through a contact hole formed in the second interlayer insulating layer 17. The second capacitance electrode CSE2 may be integrated with (e.g., may be formed integrally with) the first source electrode SE of the first transistor T1, and the first conductive pattern CDP may be electrically connected (e.g., electrically coupled) to the first source electrode SE. The first conductive pattern CDP may also be in contact with the first electrode 21 to be described below, and the first transistor T1 may transmit a first power voltage applied from the first voltage line VL1 to the first electrode 21 through the first conductive pattern CDP. Although it is shown in the drawings that the second data conductive layer includes one second voltage line VL2 and one first voltage line VL1, the disclosure is not limited thereto. The second data conductive layer may include a larger number of first voltage lines VL1 and/or a larger number of second voltage lines VL2.

The second data conductive layer may be formed as a single layer or multiple layers including any one of molybdenum (Mo), aluminum (Al), chromium (Cr), gold (Au), titanium (Ti), nickel (Ni), neodymium (Nd), copper (Cu), or an alloy thereof. However, the disclosure is not limited thereto.

A first planarization layer 19 is on the second data conductive layer. The first planarization layer 19 may include an organic insulating material, for example, an organic material such as polyimide (PI), and may perform a surface planarization function.

A plurality of first banks BNL1, a plurality of electrodes 21 and 22, a light emitting element 30, a plurality of contact electrodes CNE1 and CNE2, and a second bank BNL2 may be arranged on the first planarization layer 19. Further, a plurality of insulating layers PAS1, PAS2, PAS3, and PAS4 may be arranged on the first planarization layer 19.

The plurality of first banks BNL1 may be directly arranged on the first planarization layer 19. The plurality of first banks BNL1 have a shape extending in the second direction DR2 within each sub-pixel PXn, but may not extend to another adjacent sub-pixel PXn in the second direction DR2 and may be arranged in the light emission area EMA. In one or more embodiments, the plurality of first banks BNL1 are arranged to be spaced apart from each other in the first direction DR1, and the light emitting element 30 may be positioned therebetween. The plurality of first banks BNL1 may be provided for each sub-pixel PXn to form a linear pattern in the display area DPA of the display device 10. In the drawings, two first banks BNL1 are illustrated, but the disclosure is not limited thereto. A larger number of first banks BNL1 may be provided, depending on the number of electrodes 21 and 22.

The first bank BNL1 may have a structure in which at least a part thereof protrudes from the upper surface of the first planarization layer 19. The protrusion portion of the first bank BNL1 may have an inclined side surface, and the light emitted from the light emitting element 30 may be reflected from the electrodes 21 and 22 positioned on the first bank BNL1 and emitted in the upward direction of (e.g., away from) the first planarization layer 19. The first bank BNL1 may provide an area in which the light emitting element 30 is positioned, and at the same time, may function as a reflective barrier that reflects light emitted from the light emitting element 30 in an upward direction. The side surface of first bank BNL1 may be inclined in a linear shape, but is not limited thereto, and in some embodiments, the outer surface of the first bank BNL1 may have a curved semi-circle or semi-ellipse shape. The first bank BNL1 may include an organic insulating material such as polyimide (PI), but the material thereof is not limited thereto.

The plurality of electrodes 21 and 22 are arranged on the first bank BNL1 and the first planarization layer 19. The plurality of electrodes 21 and 22 may include a first electrode 21 and a second electrode 22. The first electrode 21 and the second electrode 22 may extend in the second direction DR2, and may be spaced apart from each other in the first direction DR1.

Each of the first electrode 21 and the second electrode 22 may extend in the second direction DR2 within the sub-pixel PXn, and may be separated from other electrodes 21 and 22 in the cut area CBA. For example, the cut area CBA may be between the light emission areas EMA of the sub-pixels PXn neighboring in the second direction DR2, and the first electrode 21 and the second electrode 22 may be separated from other first and second electrodes 21 and 22 in the sub-pixels PXn neighboring in the second direction DR2 in the cut area CBA. However, the disclosure is not limited thereto, and some of the electrodes 21 and 22 may extend beyond the sub-pixels PXn neighboring in the second direction DR2, without being separated from each other for each pixel PXn, or only one of the first electrode 21 and the second electrode 22 may be separated.

The first electrode 21 may be electrically connected (e.g., electrically coupled) to the first transistor T1 through a first contact hole CT1, and the second electrode 22 may be electrically connected (e.g., electrically coupled) to the second voltage line VL2 through a second contact hole CT2. For example, the first electrode 21 may be in contact with the first conductive pattern CDP through the first contact hole CT1 penetrating the first planarization layer 19 in the portion extending in the first direction DR1 of the second bank BNL2. The second electrode 22 may also be in contact with the second voltage line VL2 through the second contact hole CT2 penetrating the first planarization layer 19 in the portion extending in the first direction DR1 of the second bank BNL2. However, the disclosure is not limited thereto. In one or more other embodiments, the first contact hole CT1 and the second contact hole CT2 may be within the light emission area EMA surrounded by the second bank BNL2 so as not to overlap the second bank BNL2.

Although it is illustrated in the drawings that one first electrode 21 and one second electrode 22 are provided for each sub-pixel PXn, the disclosure is not limited thereto, and the number of first electrodes 21 and second electrodes 22 for each sub-pixel PXn may be greater. The first electrode 21 and the second electrode 22 in each sub-pixel PXn may not necessarily have a shape extending in one direction, and the first electrode 21 and the second electrode 22 may have various suitable structures. For example, the first electrode 21 and the second electrode 22 may have a partially curved and/or bent shape, and one electrode may be arranged to surround the other electrode.

Each of the first electrode 21 and the second electrode 22 may be directly on the first banks BNL1. Each of the first electrode 21 and the second electrode 22 may be formed to have a larger width than the first bank BNL1. For example, each of the first electrode 21 and the second electrode 22 may cover the outer surface of the first bank BNL1. Each of the first electrode 21 and the second electrode 22 may be on the side surface of the first bank BNL1, and the interval between the first electrode 21 and the second electrode 22 may be narrower than the interval between the first banks BNL1. At least a part of the first electrode 21 and at least a part of the second electrode 22 are directly on the first planarization layer 19, so that the first electrode 21 and the second electrode 22 may be on the same plane. However, the disclosure is not limited thereto. In some embodiments, each of the electrodes 21 and 22 may have a width smaller than that of the first bank BNL1. However, each of the electrodes 21 and 22 may cover at least one side surface of the first bank BNL1 to reflect the light emitted from light emitting element 30.

Each of the electrodes 21 and 22 may include a conductive material having high reflectance. For example, each of the first and second electrodes 21 and 22 (which may also be referred to herein as "alignment electrodes 21 and 22") may include a metal such as silver (Ag), copper (Cu), and/or aluminum (Al) as the conductive material having high reflectance, or may include an alloy containing aluminum (Al), nickel (Ni), and/or lanthanum (La). Each of the electrodes 21 and 22 may reflect the light emitted from the light emitting element 30 and proceeding to the side surface of the first bank BNL1 in the upward direction of each sub-pixel PXn.

However, the disclosure is not limited thereto, and each of the electrodes 21 and 22 may further include a transparent conductive material. For example, each of the electrodes 21 and 22 may include a material such as indium tin oxide (ITO), indium zinc oxide (IZO), and/or indium tin zinc oxide (ITZO). In some embodiments, each of the electrodes 21 and 22 may have a structure in which one or more transparent conductive material layers and one or more metal layers having high reflectivity are stacked, or may be formed as one layer including the transparent conductive material and the metal. For example, each of the electrodes 21 and 22 may have a stacked structure of ITO/Ag/ITO/, ITO/Ag/IZO, or ITO/Ag/ITZO/IZO.

The plurality of electrodes 21 and 22 may be electrically connected (e.g., electrically coupled) to the light emitting elements 30, and a set or predetermined voltage may be applied to the electrodes 21 and 22 such that the light emitting elements 30 emit light. The plurality of alignment electrodes 21 and 22 may be electrically connected (e.g., electrically coupled) to the light emitting elements 30 through the contact electrodes CNE1 and CNE2, and may transmit electrical signals applied to the electrodes 21 and 22 to the light emitting elements 30 through the contact electrodes CNE1 and CNE2.

One of the first electrode 21 and the second electrode 22 may be electrically connected (e.g., electrically coupled) to an anode electrode of the light emitting element 30, and the other thereof may be electrically connected (e.g., electrically coupled) to a cathode electrode of the light emitting element 30. However, the disclosure is not limited thereto, and vice versa.

Each of the electrodes 21 and 22 may be used (e.g., utilized) to form an electric field in the sub-pixel PXn to align the light emitting element 30. The light emitting element 30 may be positioned between the first electrode 21 and the second electrode 22 by an electric field formed on the first electrode 21 and the second electrode 22. The light emitting elements 30 of the display device 10 may be sprayed on the electrodes 21 and 22 through an inkjet printing process. When an ink including the light emitting elements 30 is sprayed on the electrodes 21 and 22, an alignment signal is applied to the electrodes 21 and 22 to form an electric field. The light emitting elements 30 dispersed in the ink may be aligned on the electrodes 21 and 22 by receiving an electrophoretic force by the electric field formed on the electrodes 21 and 22.

A first insulating layer PAS1 is on the first planarization layer 19. The first insulating layer PAS1 may cover the first banks BNL1, the first electrode 21, and the second electrode 22. The first insulating layer PAS1 may protect the first electrode 21 and the second electrode 22 and insulate them from each other. Further, the first insulating layer PAS1 may reduce or prevent the light emitting elements 30 thereon from being damaged by direct contact with other members.

In one or more embodiments, the first insulating layer PAS1 may include openings OP partially exposing the first electrode 21 and the second electrode 22. Each of the openings OP may partially expose portions of the electrodes 21 and 22 on the upper surface of the first bank BNL1. Portions of the contact electrodes CNE1 and CNE2 may be in contact with the electrodes 21 and 22, respectively, exposed through the opening OP.

The first insulating layer PAS1 may have a step formed between the first electrode 21 and the second electrode 22, such that a portion of the upper surface of the first insulating layer PAS1 is depressed. For example, as the first insulating layer PAS1 is provided so as to cover the first electrode 21 and the second electrode 22, the upper surface thereof may be stepped according to the shape of the electrodes 21 and 22 under the first insulating layer PAS1. However, the disclosure is not limited thereto.

The second bank BNL2 may be on the first insulating layer PAS1. The second bank BNL2 may be arranged in a grid pattern over the display area DPA, including portions extending in the first direction DR1 and the second direction DR2 in a plan view. The second bank BNL2 may be positioned across the boundary of each sub-pixel PXn to distinguish adjacent sub-pixels PXn.

The second bank BNL2 may surround the emission area EMA and the cut area CBA for each sub-pixel PXn to distinguish them. The first electrode 21 and the second electrode 22 may extend in the second direction DR2 and may be positioned across a portion of the second bank BNL2 in the first direction DR1. In the portion of the second bank BNL2 extending the second direction DR2, a portion between the light emission areas EMA may have a larger width than a portion between the cut areas CBA. Accordingly, the interval between the cut areas CBA may be smaller than the interval between the light emission areas EMA.

The second bank BNL2 may be formed to have a height greater than that of the first bank BNL1. The second bank BNL2 may reduce or prevent the overflow of ink to the adjacent sub-pixel PXn in the inkjet printing process of the process of manufacturing the display device 10, thereby separating inks, in which different light emission elements 20 are dispersed, such that the inks are not mixed with each other. Like the first bank BNL1, the second bank BNL2 may include polyimide (PI), but the material thereof is not limited thereto.

The light emitting element 30 may be on the first insulating layer PAS1. The plurality of light emitting elements 30 are arranged to be spaced apart from each other along the second direction DR2 in which the electrodes 21 and 22 extend, and may be substantially aligned in parallel with each other. The light emitting element 30 may have a shape extending in one direction, and a direction in which the electrodes 21 and 22 extend may be substantially perpendicular to a direction in which the light emitting elements 30 extend. However, the disclosure is not limited thereto, and the light emitting element 30 may be positioned obliquely in a direction in which the electrodes 21 and 22 extend without being perpendicular to the direction in which the electrodes 21 and 22 extend.

The light emitting elements 30 in each sub-pixel PXn may include light emitting layers (e.g., element '36' in FIG. 5) containing different materials to emit light of different wavelengths to the outside. Accordingly, light of the first color, light of the second color, and light of the third color may be emitted from the first sub-pixel PX1, the second sub-pixel PX2, and the third sub-pixel PX3, respectively. However, the disclosure is not limited thereto, and each of the sub-pixels PXn may include the same type (or kind) of light emitting elements 30 to emit light of substantially the same color.

Both ends of the light emitting element 30 may be on the electrodes 21 and 22 between the first banks BNL1. The extending length of the light emitting element 30 may be longer than the interval between the first electrode 21 and the second electrode 22, and both ends of the light emitting element 30 may be on the first electrode 21 and the second electrode 22, respectively. For example, one end of the light emitting element 30 may be placed on the first electrode 21, and the other end thereof may be placed on the second electrode 22.

The light emitting element 30 may be provided with a plurality of layers in a direction perpendicular (e.g., substantially perpendicular) to the upper surface of the substrate 11 or the first planarization layer 19. The light emitting element 30 may be positioned such that one extending direction is parallel to the upper surface of the first planarization layer 19, and the plurality of semiconductor layers included in the light emitting element 30 may be sequentially arranged along a direction parallel to the upper surface of the first planarization layer 19. However, the disclosure is not limited thereto. When the light emitting element 30 has a different structure, the plurality of semiconductor layers may be arranged in a direction perpendicular (e.g., substantially perpendicular) to the first planarization layer 19.

Both ends of the light emitting element 30 may contact the contact electrodes CNE1 and CNE2, respectively. For example, the light emitting element 30 may not be provided with an insulating film (e.g., element '38' in FIG. 5) on the end surface in one direction, and a part of the semiconductor layer (e.g., elements '31' and/or '32' in FIG. 5) and a part of the electrode layer (e.g., element '37' in FIG. 5) may be exposed, and thus the exposed semiconductor layer (e.g., elements '31' and/or '32' in FIG. 5) and electrode layer (e.g., element '37' in FIG. 5) may contact the contact electrodes CNE1 and CNE2. However, the disclosure is not limited thereto. In the light emitting element, at least a part of the insulating film 38 may be removed, so that both side surfaces of the semiconductor layer and the electrode layer (e.g., elements '31', '32', and/or '37' in FIG. 5) may be partially exposed. The exposed side surfaces of the semiconductor layer (e.g., elements '31' and/or '32' in FIG. 5) may directly contact the contact electrodes CNE1 and CNE2.

A second insulating layer PAS2 may be partially on the light emitting element 30. For example, the second insulating layer PAS2 may be on the light emitting element 30 to have a width (e.g., in the first direction DR1) smaller than the length of the light emitting element 30, such that the second insulating layer PAS2 exposes both ends of the light emitting element 30 while surrounding the light emitting element 30. The second insulating layer PAS2 may cover the light emitting element 30, the electrodes 21 and 22, and the first insulating layer PAS1 during the process of manufacturing the display device 10, and then may be removed to expose both ends of the light emitting element 30. The second insulating layer PAS2 may be on the first insulating layer PAS1 to extend in the second direction DR2 in a plan view, thereby forming a linear or island-shaped pattern in each sub-pixel PXn. The second insulating layer PAS2 may protect the light emitting element 30 and fix the light emitting element 30 in the process of manufacturing the display device 10.

A plurality of contact electrodes CNE1 and CNE2 and a third insulating layer PAS3 may be on the second insulating layer PAS2.

The plurality of contact electrodes CNE1 and CNE2 may have a shape extending in one direction, and may be on each of the electrodes 21 and 22, respectively. The contact electrodes CNE1 and CNE2 may include a first contact electrode CNE1 on the first electrode 21 and a second contact electrode CNE2 on the second electrode 22. The contact electrodes CNE1 and CNE2 may be spaced apart from each other and may face each other. For example, the first contact electrode CNE1 and the second contact electrode CNE2 may be on the first electrode 21 and the second electrode 22, respectively, and may be spaced apart from each other in the first direction DR1. Each of the contact electrodes CNE1 and CNE2 may form a stripe pattern in the light emission area EMA of each sub-pixel PXn.

Each of the plurality of contact electrodes CNE1 and CNE2 may contact the light emitting element 30. The first contact electrode CNE1 may contact one end of the light emitting element 30, and the second contact electrode CNE2 may contact the other end of the light emitting element 30. In the light emitting element 30, a semiconductor layer is exposed on both end surfaces in an extending direction of the light emitting element 30, and the contact electrodes CNE1 and CNE2 may be in electrical contact with the semiconductor layer and electrode layer of the light emitting element 30. One side of each of the contact electrodes CNE1 and CNE2 in contact with both ends of the light emitting element 30 may be on the second insulating layer PAS2. The first contact electrode CNE1 may contact the first electrode 21 (which may also be referred to herein as "first alignment electrode 21") through an opening OP exposing a part of the upper surface of the first electrode 21, and the second contact electrode CNE2 may contact the second electrode 22 through an opening OP exposing a part of the upper surface of the second electrode 22.

The width of each of the contact electrodes CNE1 and CNE2 measured in one direction (e.g., in the first direction DR1) may be smaller than the width of each of the electrodes 21 and 22 measured in the one direction. Each of the contact electrodes CNE1 and CNE2 may contact one end and the other end of the light emitting element 30 and cover a part of the upper surface of each of the first electrode 21 and the second electrode 22. However, the disclosure is not limited thereto, and the contact electrodes CNE1 and CNE2 may be formed to have larger widths than the electrodes 21 and 22 to cover both sides of the electrodes 21 and 22.

The contact electrodes CNE1 and CNE2 may each independently include a transparent conductive material. For example, the contact electrodes CNE1 and CNE2 may include ITO, IZO, ITZO, and/or aluminum (Al). The light emitted from the light emitting element 30 may pass through the contact electrodes CNE1 and CNE2 and proceed toward the electrodes 21 and 22. However, the disclosure is not limited thereto.

Although it is shown in the drawings that two contact electrodes CNE1 and CNE2 are in one sub-pixel PXn, the disclosure is not limited thereto. The number of contact electrodes CNE1 and CNE2 may be changed depending on the number of electrodes 21 and 22 for each sub-pixel PXn.

The third insulating layer PAS3 may cover the first contact electrode CNE1. For example, the third insulating layer PAS3 may cover the first contact electrode CNE1 such that the third insulating layer PAS3 covers one side on which the first contact electrode CNE1 is positioned based on (e.g., relative to) the second insulating layer PAS2. The third insulating layer PAS3 may cover one side on which the first contact electrode CNE1 is positioned based on (e.g., relative to) the second insulating layer PAS2, in addition to the first contact electrode CNE1. For example, the third insulating layer PAS3 may cover the first contact electrode CNE1 and the first electrode 21. Such an arrangement may be formed by a process of partially removing an insulating material layer to form the second contact electrode CNE2 after entirely placing the insulating material layer forming the third insulating layer PAS3 in the light emission area EMA. In the above process, the insulating material layer forming the third insulating layer PAS3 may be removed together with the insulating material layer forming the second insulating layer PAS2, and one side of the third insulating layer PAS3 may be aligned with one side of the second insulating layer PAS2. One side of the second contact electrode CNE2 may be on the third insulating layer PAS3, and the second contact electrode CNE2 may be insulated from the first contact electrode CNE1 with the third insulating layer PAS3 therebetween.

The fourth insulating layer PAS4 may be entirely in the display area DPA of the substrate 11. The fourth insulating layer PAS4 may function to protect the members on the substrate 11 from an external environment. However, in some embodiments the fourth insulating layer PAS4 may be omitted.

Each of the above-described first insulating layer PAS1, second insulating layer PAS2, third insulating layer PAS3, and the fourth insulating layer PAS4 may include an inorganic insulating material or an organic insulating material. For example, each of the first insulating layer PAS1, the second insulating layer PAS2, the third insulating layer PAS3, and the fourth insulating layer PAS4 may include an inorganic insulating material such as silicon oxide (SiOx), silicon nitride (SiNx), silicon oxynitride (SiOxNy), aluminum oxide ($Al_2O_3$), and/or aluminum nitride (AlN). In one or more embodiments, each of the first insulating layer PAS1, second insulating layer PAS2, third insulating layer PAS3, and the fourth insulating layer PAS4 may include an organic insulating layer such as acrylic resin, epoxy resin, phenol resin, polyamide resin, polyimide resin, unsaturated polyester resin, polyphenylene resin, polyphenylene sulfide resin, benzocyclobutene, cardo resin, siloxane resin, silsesquioxane resin, polymethyl methacrylate, polycarbonate, and/or polymethyl methacrylate-polycarbonate synthetic resin. However, the disclosure is not limited thereto.

FIG. 5 is a schematic view of a light emitting element according to one or more embodiments.

Referring to FIG. 5, the light emitting element 30 is a particulate element (e.g., may be formed into particles), and may have a rod or cylindrical shape having a set or predetermined aspect ratio. The light emitting element 30 may have a size on a nanometer scale (the nanometer scale may be from 1 nm or more to less than 1 μm) or a micrometer scale (the micrometer scale may be from 1 μm or more to less than 1 mm). In one or more embodiments, the light emitting element 30 may have a size on a nanometer scale in both diameter and length, or may have a size on a micrometer scale in both diameter and length. In some embodiments, the light emitting element 30 may have a size on a nanometer scale in diameter, whereas may have a size on a micrometer scale in length. In some embodiments, some light emitting elements 30 may have a size on a nanometer scale in diameter and/or length, whereas other light emitting elements 30 may have a size on a micrometer scale in diameter and/or length.

In one or more embodiments, the light emitting element 30 may be an inorganic light emitting diode. For example, the light emitting element 30 may include semiconductor layers doped with any conductive type (for example, p-type or n-type) impurity. The semiconductor layers may receive an electrical signal applied from an external power source and may emit light of a set or specific wavelength band.

The light emitting element 30 according to one or more embodiments may include a first semiconductor layer 31, a light emitting layer 36, a second semiconductor layer 32, and an electrode layer 37, which are sequentially stacked. The light emitting element 30 may further include an insulating film 38 surrounding the outer surfaces of the first semiconductor layer 31, the second semiconductor layer 32, the light emitting layer 36, and the electrode layer 37.

The first semiconductor layer 31 may be an n-type semiconductor layer. When the light emitting element 30 emits (or is to emit) light of a blue wavelength band, the first semiconductor layer 31 may include a semiconductor material having a chemical formula of $Al_xGa_yIn_{1-x-y}N$ ($0 \le x \le 1$, $0 \le y \le 1$, $0 \le x+y \le 1$). For example, the semiconductor material may be at least one selected from the group consisting of AlGaInN, GaN, AlGaN, InGaN, AlN, and InN, each being doped with n-type impurities. The first semiconductor layer 31 may be doped with an n-type dopant. The n-type dopant may be Si, Ge, and/or Sn. For example, the first semiconductor layer 31 may be n-GaN doped with n-type Si. The length of the first semiconductor layer 31 may be in a range of about 1.5 μm to about 5 μm, but is not limited thereto.

The second semiconductor layer 32 is on the light emitting layer 36 to be described below. The second semiconductor layer 32 may be a p-type semiconductor layer. When the light emitting element 30 emits (or is to emit) light of a blue wavelength band or a green wavelength band, the second semiconductor layer 32 may include a semiconductor material having a chemical formula of $Al_xGa_yIn_{1-x-y}N$ ($0 \le x \le 1$, $0 \le y \le 1$, $0 \le x+y \le 1$). For example, the semiconductor material may be at least one selected from the group consisting of AlGaInN, GaN, AlGaN, InGaN, AlN, and InN, each being doped with p-type impurities. The second semiconductor layer 32 may be doped with a p-type dopant. The p-type dopant may be Mg, Zn, Ca, Se, and/or Ba. For example, the second semiconductor layer 32 may be p-GaN doped with p-type Mg. The length of the second semiconductor layer 32 may be in a range of about 0.05 μm to about 0.10 μm, but is not limited thereto.

Although it is shown in FIG. 5 that each of the first semiconductor layer 31 and the second semiconductor layer 32 is formed as one layer, the disclosure is not limited thereto. Each of the first semiconductor layer 31 and the second semiconductor layer 32 may further include a larger number of layers, for example, clad layer(s) and/or tensile strain barrier reducing (TSBR) layer(s), according to the material of the light emitting layer 36.

The light emitting layer 36 may be between the first semiconductor layer 31 and the second semiconductor layer 32. The light emitting layer 36 may include a material of a single or multiple quantum well structure. When the light emitting layer 36 includes a material of a multiple quantum well structure, the light emitting layer 36 may have a structure in which quantum layers and well layers are alternately stacked. The light emitting layer 36 may emit light by the combination of electron-hole pairs according to an electrical signal applied through the first semiconductor layer 31 and the second semiconductor layer 32. When the light emitting layer 36 emits (or is to emit) light of a blue wavelength band, the light emitting layer 36 may include a material such as AlGaN and/or AlGaInN. For example, when the light emitting layer 36 has a multiple quantum well structure in which quantum layers and well layers are alternately stacked, the quantum wells may include a material such as AlGaN and/or AlGaInN, and the well layers may include a material such as GaN and/or AlInN. For example, the light emitting layer 36 includes quantum wells each containing AlGaInN, and well layers each containing AlInN, and thus the light emitting layer 36 may emit blue light having a central wavelength band of about 450 nm to about 495 nm as described above.

However, the disclosure is not limited thereto, and the light emitting layer 36 may have a structure in which semiconductor materials having high bandgap energy and semiconductor materials having low bandgap energy are alternately stacked, and may include other Group 3 to Group 5 semiconductor materials depending on the wavelength band of light. The light emitted from the light emitting layer 36 is not limited to light of a blue wavelength band, and in some embodiments, the light emitting layer 36 may emit light of a red or green wavelength band. The length of the light emitting layer 36 may be in a range of about 0.05 μm to about 0.10 μm, but is not limited thereto.

In one or more embodiments, the light emitted from the light emitting layer 36 may be emitted to both side surfaces of the light emitting element 30 as well as the longitudinal outer surface of the light emitting element 30. The direction of the light emitted from the light emitting layer 36 is not limited to one direction.

The electrode layer 37 may be an ohmic contact electrode. However, the disclosure is not limited thereto, and the electrode layer 37 may be a Schottky contact electrode. The light emitting element 30 may include at least one electrode layer 37. Although it is shown in FIG. 5 that the light emitting element 30 includes one electrode layer 37, the disclosure is not limited thereto. In some embodiments, the light emitting element 30 may include a larger number of electrode layers 37, or the electrode layer 37 may be omitted. A description of the light emitting element 30 to be described below may be equally applied even if the number of electrode layers 37 is changed or the light emitting element 30 further includes other structures.

When the light emitting element 30 is electrically connected (e.g., electrically coupled) to an electrode or a contact electrode in the display device 10 according to one or more embodiments, the electrode layer 37 may reduce resistance between the light emitting element 30 and the electrode or the contact electrode. The electrode layer 37 may include a conductive metal. For example, the electrode layer 37 may include at least one selected from the group consisting of aluminum (Al), titanium (Ti), indium (In), gold (Au), silver (Ag), indium tin oxide (ITO), indium zinc oxide (IZO), and indium tin-zinc oxide (ITZO). The electrode layer 37 may include a semiconductor material doped with n-type or p-type impurities. The electrode layer 37 may include the same material, and may include materials different from each other, but the disclosure is not limited thereto.

The insulating film 38 may surround the outer surfaces of the above-described semiconductor layers and electrode layers. For example, the insulating film 38 may surround at least the outer surface of the light emitting layer 36, and may extend in one direction in which the light emitting element 30 extends. The insulating film 38 may function to protect the members. For example, the insulating film 38 may be formed to surround the side surfaces of the members, and may be formed such that both ends of the light emitting element 30 in a length direction (e.g., extension direction) thereof are exposed.

Although it is shown in FIG. 5 that the insulating film 38 may extend in the length direction of the light emitting element 30 to cover the first semiconductor layer 31 to the side surface of the electrode layer 37, the disclosure is not limited thereto. The insulating film 38 may cover only the outer surface of a portion of the semiconductor layer as well as the light emitting layer 36, or cover only a portion of the outer surface of the electrode layer 37 to partially expose the outer surface of the electrode layer 37. The insulating film 38 may be formed to have a rounded cross-sectional upper surface in an area adjacent to at least one end of the light emitting element 30.

The thickness of the insulating film 38 may be in a range of about 10 nm to about 1.0 μm, but is not limited thereto. For example, the thickness of the insulating film 38 may be about 40 nm.

The insulating film 38 may include a material having insulating properties, for example, silicon oxide (SiOx), silicon nitride (SiNx), silicon oxynitride (SiOxNy), aluminum nitride (AlN), and/or aluminum oxide ($Al_2O_3$). Accordingly, the light emitting layer 36 may reduce or prevent an electrical short (e.g., an electrical short circuit) that may occur when the light emitting layer 36 is in direct contact with an electrode through which an electrical signal is transmitted to the light emitting element 30. Further, because the insulating film 38 protects the outer surface of the light emitting element 30 as well as the light emitting layer 36, it is possible to reduce or prevent the deterioration in light emission efficiency.

In one or more embodiments, the outer surface of the insulating film 38 may be surface-treated. The light emitting elements 30 may be aligned by being sprayed onto the electrodes in a state in which they are dispersed in a set or predetermined ink. Here, the surface of the insulating film 38 may be hydrophobically or hydrophilically treated in order to maintain the light emitting elements 30 in a dispersed state without being aggregated with other adjacent light emitting elements 30 in the ink. For example, the outer surface of the insulating film 38 may be surface-treated with a material such as stearic acid and/or 2,3-naphthalene dicarboxylic acid.

In the above-described display device 10, the first wavelength conversion part WLC1, the second wavelength conversion part WLC2, and the light transmission part LTU may be formed by spraying a set or predetermined ink, in which the scatterers SCT1, SCT2, and SCT3 are dispersed in the base resins BS1, BS2, and BS3, respectively, onto the substrate 11 during the process of manufacturing the display device 10. Further, the light emitting elements 30 of the display device 10 may also be sprayed onto the substrate 11 in a state of being dispersed in a set or predetermined ink, and may be aligned.

The above-described scatterers SCT1, SCT2, and SCT3 and light emitting elements 30 may be formed into fine particles, the fine particles may be dispersed in a ink, and the ink may be sprayed onto the substrate 11. After the ink is supplied through an inlet of a print head unit and dispersed through nozzles, the remaining ink is circulated through an outlet of the print head unit. However, because an area adjacent to the outlet of the print head unit may have a reduced flow velocity as compared with an area adjacent to the inlet of the print head unit, the fine particles may be precipitated in the area adjacent to the outlet, so that the number of fine particles in the ink sprayed through the nozzles may decrease.

Hereinafter, an inkjet printing apparatus for reducing or preventing the precipitation of particles remaining in a print head unit and making the number of particles in an ink uniform (or substantially uniform) will be described.

Figure 7:
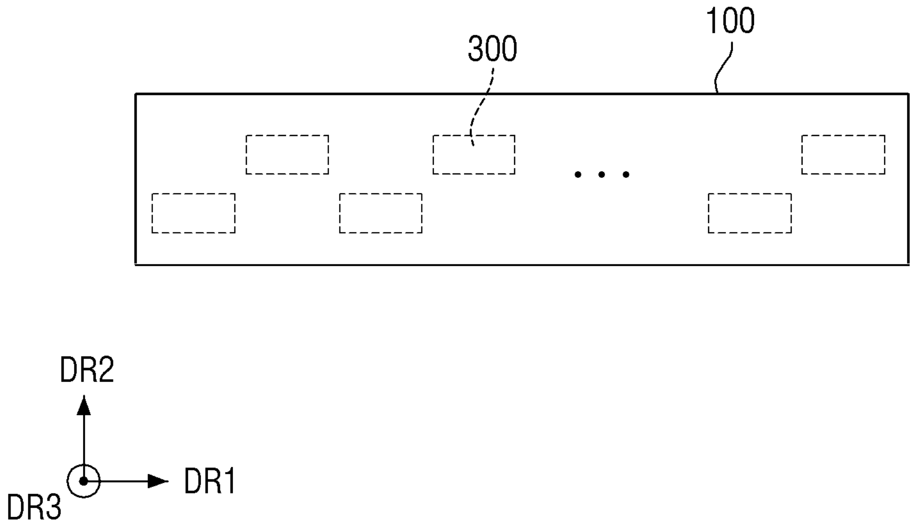
FIG. 7 is a schematic bottom view of a print head unit according to one or more embodiments.
Figure 8:
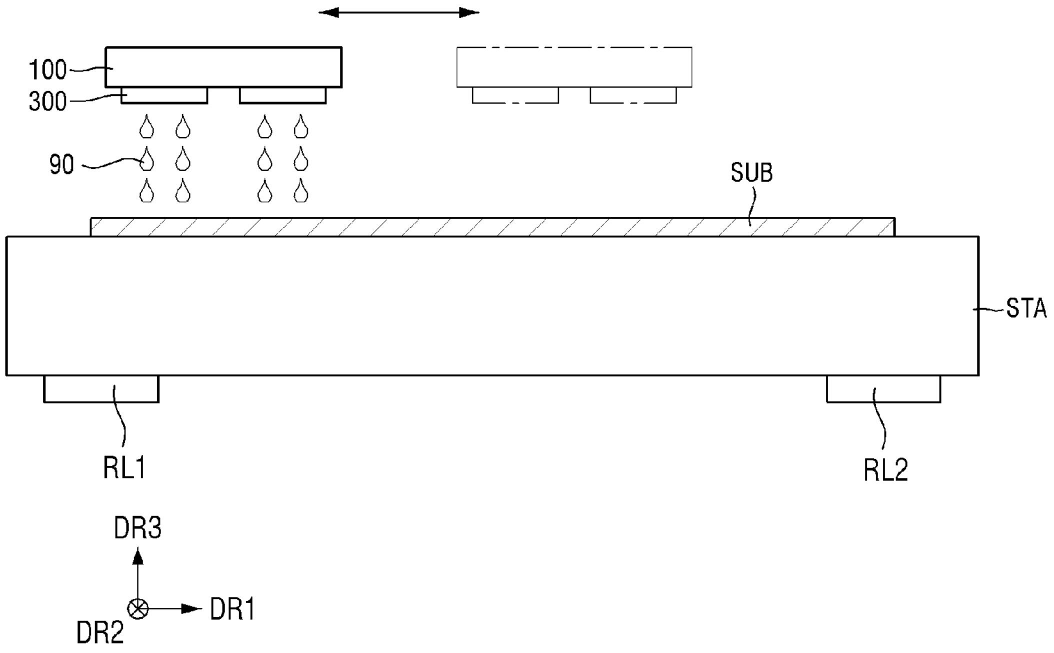
FIG. 8 is a schematic view illustrating an operation of a print head unit according to one or more embodiments.
Figure 9:
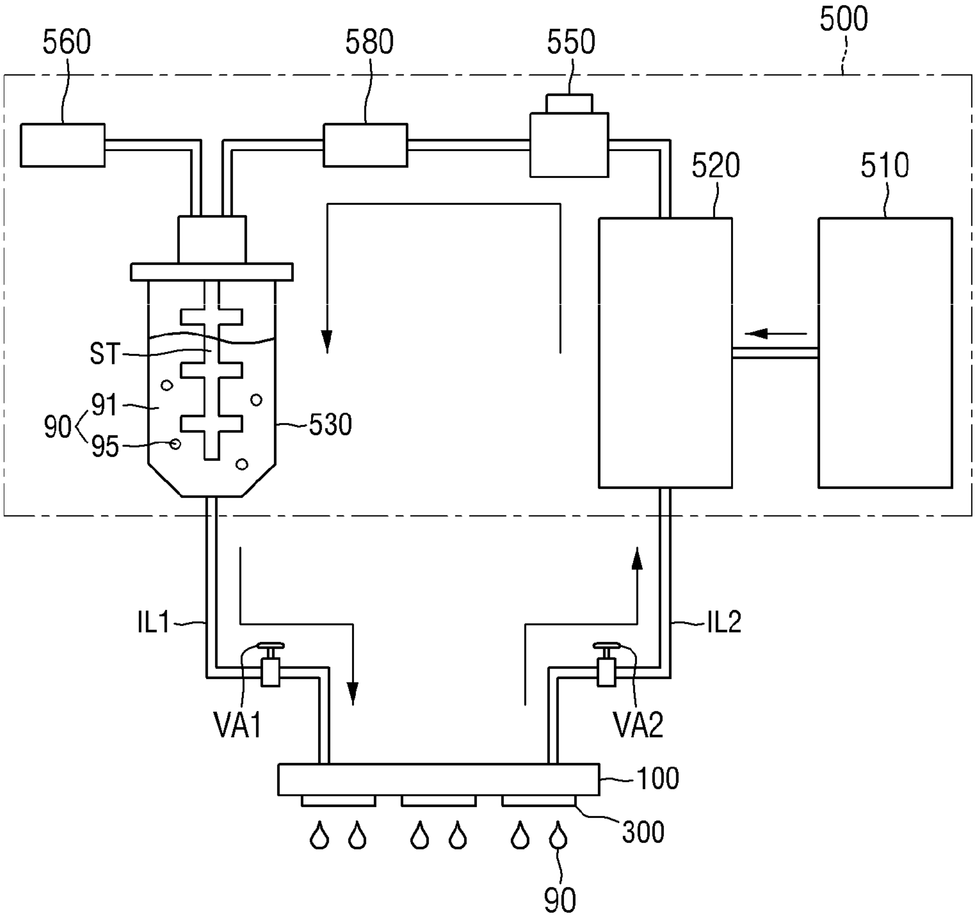
FIG. 9 is a schematic view illustrating a print head unit according to one or more embodiments.

FIG. 6 is a schematic plan view of an inkjet printing apparatus according to one or more embodiments. FIG. 7 is a schematic bottom view of a print head unit according to one or more embodiments. FIG. 8 is a schematic view illustrating an operation of a print head unit according to one or more embodiments. FIG. 9 is a schematic view illustrating a print head unit according to one or more embodiments.

Referring to FIGS. 6 to 9, an inkjet printing apparatus 1000 according to one or more embodiments includes a print head unit 100 including a plurality of inkjet heads 300. The inkjet printing apparatus 1000 may further include a stage STA, an ink circulation unit 500, and a base frame 600.

The inkjet printing apparatus 1000 may spray set or predetermined ink 90 onto a target substrate SUB using the print head unit 100. The target substrate SUB may be provided on the stage STA.

The stage STA may provide an area in which the target substrate SUB is placed. The inkjet printing apparatus 1000 includes a first rail RL1 and a second rail RL2 extending in the second direction DR2, and the stage STA is placed on the first rail RL1 and the second rail RL2. The stage STA may move on the first rail RL1 and the second rail RL2 in the second direction DR2 through a separate moving member. The stage STA may move in the second direction DR2, and the ink 90 may be sprayed on the stage STA while passing through the print head unit 100. However, the disclosure is not limited thereto. Although it is illustrated in the drawings that the stage STA moves, in some embodiments, the stage STA may be fixed, and the print head unit 100 may move. In this case, the print head unit 100 may be mounted on a frame on the first rail RL1 and the second rail RL2.

The print head unit 100 may include the plurality of inkjet heads 300, and may be placed on the base frame 600. The print head unit 100 may spray a set or predetermined ink 90 onto the target substrate SUB by using the inkjet head 300 connected (e.g., physically coupled) to a separate ink storage unit.

The base frame 600 may include a support unit 610 and a moving unit 630. The support unit 610 may include a first support 611 extending in the first direction DR1 (horizontal direction) and a second support 612 connected (e.g., physically coupled) to the first support 611 and extending in the third direction DR3 (vertical direction). The extending direction of the first support 611 may be the same as the first direction DR1. The print head unit 100 may be placed on the moving unit 630 mounted on the first support 611.

The moving unit 630 may include a moving portion 631 mounted on the first support 611 and moving in one direction, and a fixing portion 632 on the lower surface of the moving portion 631 and provided with the print head unit 100. The moving portion 631 may move on the first support 611 in the first direction DR1, and the print head unit 100 may be fixed to the fixing portion 632 and move together with the moving portion 631 in the first direction DR1.

The print head unit 100 may be on the base frame 600 and spray the ink 90 provided from an ink storage unit onto the target substrate SUB through the inkjet head 300. The print head unit 100 may be spaced apart from the stage STA passing under the base frame 600 by a set or specific distance. The distance between the print head unit 100 and the stage STA may be adjusted by the height of the second support 612 of the base frame 600. The distance between the print head unit 100 and the stage STA may be adjusted within the range capable of securing a space required for a printing process such that the print head unit 100 has a certain (suitable) distance from the target substrate SUB when the target substrate SUB is on the stage STA.

According to one or more embodiments, the print head unit 100 may include the inkjet head 300 including a plurality of nozzles 350. The plurality of nozzles 350 may be on the lower surface of the print head unit 100.

The plurality of inkjet heads 300 may be arranged to be spaced apart from each other in one direction, and may be arranged in one row or in a plurality of rows. In the drawing, the inkjet heads 300 are arranged in two rows, and the inkjet heads 300 in each row are arranged alternately with each other. However, the disclosure is not limited thereto, and the inkjet heads 300 may be arranged in a larger number of rows, and may be arranged to overlap each other without crossing each other. The shape of the inkjet head 300 is not particularly limited, but as an example, the inkjet head 300 may have a rectangular shape.

At least one inkjet head 300, for example, two inkjet heads 300 adjacent to each other may form one pack. However, the number of inkjet heads 300 included in one pack is not limited thereto, and as an example, the number of inkjet heads 300 included in one pack may be 1 to 5. Although it is shown in the drawing that the print head unit 100 is provided with only six inkjet heads 300, this is for schematically illustrating the print head unit 100, and the number of inkjet heads 300 is not limited thereto.

The inkjet head 300 on the print head unit 100 may spray the ink 90 onto the target substrate SUB on the stage STA. According to one or more embodiments, the print head unit 100 may move on the first support 611 in one direction, and the inkjet head 300 may move in the one direction to spray the ink 90 onto the target substrate SUB.

The print head unit 100 may move in the first direction DR1 in which the first support 611 extends, and the inkjet head 300 may move in the first direction DR1 to spray the ink 90 onto the target substrate SUB.

In one or more embodiments, the ink 90 may include a solvent 91 and a plurality of particles 95 included in the solvent 91. In one or more embodiments, the ink 90 may be provided in a solution or colloid state. Examples of the solvent 91 may include, but are not limited to, acetone, water, alcohol, toluene, propylene glycol (PG), propylene glycol methyl acetate (PGMA), triethylene glycol monobutyl ether (TGBE), diethylene glycol monophenyl ether (DGPE), an amide solvent, a dicarbonyl solvent, diethylene glycol dibenzoate, a tricarbonyl solvent, triethyl citrate, a phthalate solvent, benzyl butyl phthalate, bis(2-ethylhexyl) phthalate, bis(2-ethylhexyl) isophthalate, and ethyl phthalyl ethyl glycolate. The plurality of particles 95 may be included in a state of being dispersed in the solvent 91 and supplied to the print head unit 100 to be discharged.

In some embodiments, the width of the target substrate SUB measured in the first direction DR1 may be greater than the width of the print head unit 100. In this case, the print head unit 100 may move in the first direction DR1 and may spray the ink 90 entirely on the target substrate SUB. When a plurality of target substrates SUB are provided, the print head unit 100 may respectively spray the ink 90 onto the plurality of target substrates SUB while moving in the first direction DR1.

However, the disclosure is not limited thereto, and the print head unit 100 may be located outside the first rail RL1 and the second rail RL2 and then move in the first direction DR1 to spray the ink 90 onto the target substrate SUB. When the stage STA moves in the second direction DR2 and is located under the base frame 600, the print head unit 100 may move between the first rail RL1 and the second rail RL2 to spray the ink 90 through the inkjet head 300. The operation of the inkjet head 300 is not limited thereto, and may be variously suitably modified within a range capable of implementing a similar process.

The inkjet printing apparatus 1000 may further include an ink circulation unit 500. The ink circulation unit 500 may supply the ink 90 to the print head unit 100, and the inkjet head 300 may discharge the supplied ink 90. The ink 90 circulates between the ink circulation unit 500 and the inkjet head 300. A part of the ink 90 supplied to the inkjet head 300 may be discharged from the inkjet head 300, and the remaining ink 90 may be supplied back to the ink circulation unit 500 again.

The ink circulation unit 500 may be connected (e.g., physically coupled) to the inkjet head 300 through a first connection pipe IL1 and a second connection pipe IL2. For example, the ink circulation unit 500 may supply the ink 90 to the inkjet head 300 through the first connection pipe IL1, and the flow rate of the supplied ink 90 may be adjusted through a first valve VA1. Further, the ink 90 remaining after being discharged from the inkjet head 300 may be supplied to the ink circulation unit 500 through the second connection pipe IL2. The flow rate of the ink 90 supplied to the ink circulation unit 500 through the second connection pipe IL2 may be adjusted through a second valve VA2. As the ink 90 is circulated through the ink circulation unit 500, a variation in the number of particles 95 included in the ink 90 discharged from the inkjet head 300 may be reduced or minimized.

The ink circulation unit 500 may be mounted on the base frame 600, but the disclosure is not limited thereto. The ink circulation unit 500 is provided in the inkjet printing apparatus 1000, but its position and/or shape are not particularly limited. For example, the ink circulation unit 500 may be provided through a separate device, and may be variously suitably modified so long as it is connected (e.g., coupled) to the inkjet head 300.

In some embodiments, the ink circulation unit 500 may include a first ink storage unit 510, a second ink storage unit 520, a third ink storage unit 530, a pressure pump 550, a compressor 560, and a flow meter 580. In the ink circulation unit 500, the second ink storage unit 520, the pressure pump 550, and the third ink storage unit 530 are connected (e.g., physically coupled) to the inkjet head 300, and may form one ink circulation system.

The first ink storage unit 510 may be a storage unit in which the prepared ink 90 is stored. The ink 90 including the solvent 91 and the particles 95 may be stored in the first ink storage unit 510 of the ink circulation unit 500, and may be supplied to the ink circulation system.

The second ink storage unit 520 is connected (e.g., physically coupled) to the first ink storage unit 510, and the stored ink 90 may be supplied to the second ink storage unit 520. Further, the ink 90 remaining after being discharged from the inkjet head 300 may be supplied to the second ink storage unit 520 through the second connection pipe IL2. The second ink storage unit 520 may be located between the inkjet head 300 and the first ink storage unit 510 to constitute an ink circulation system together with the third ink storage unit 530. When the second ink storage unit 520 is omitted, an excessive amount of ink 90 may be supplied to the third ink storage unit 530, so that the dispersion of the particles 95 may not be easy. The ink circulation unit 500 may further include the second ink storage unit 520 to reduce or prevent an excessive amount of ink 90 from being supplied to the third ink storage unit 530. For example, the second ink storage unit 520 may serve as a buffer storage unit in which a part of the ink circulated in the ink circulation system is stored.

The ink 90 supplied to the second ink storage unit 520 may be supplied to the third ink storage unit 530 through the pressure pump 550. The pressure pump 550 may be a pump that transmits power to a fluid (e.g., facilitates the movement of fluid) such that the ink 90 may be circulated in the ink circulation system. The ink 90 supplied to the second ink storage unit 520 may be supplied to the third ink storage unit 530 by the pressure pump 550. The flow meter 580 may be provided between the pressure pump 550 and the third ink storage unit 530, and may measure a flow rate of the ink 90 supplied to the third ink storage unit 530. The pressure pump 550 may adjust the flow rate of the ink 90 supplied to the third ink storage unit 530 according to the flow rate of the ink 90 measured by the flow meter 580.

The ink circulation unit 500 may further include the compressor 560, and the compressor 560 may adjust the pressure in the third ink storage unit 530. The compressor 560 may remove gas such that the inside of the third ink storage unit 530 is in a vacuum state, or may introduce an external inert gas to have a set or predetermined pressure. However, the disclosure is not limited thereto, and the compressor 560 of the ink circulating unit 500 may be omitted.

The third ink storage unit 530 may be connected (e.g., physically coupled) to the second ink storage unit 520 through the pressure pump 550, to allow the ink 90 to be supplied to the third ink storage unit 530. In one or more embodiments, the third ink storage unit 530 may supply the ink 90 to the inkjet head 300 through the first connection pipe IL1. In one or more embodiments, the third ink storage unit 530 may include a stirrer ST, and the stirrer ST may disperse the particles 95 in the ink 90. The ink 90 supplied to the third ink storage unit 530 may be maintained in a state in which the particles 95 are dispersed without being sunk as the stirrer ST rotates. For example, the stirrer ST of the third ink storage unit 530 may cause the particles 95 to sink under (e.g., to the bottom of) the third ink storage unit 530, thereby reducing or preventing a decrease in the number of the particles 95 in the ink 90 discharged through the inkjet head 300. The third ink storage unit 530 may supply the ink 90 in which the particles 95 are dispersed to the inkjet head 300, and the inkjet head 300 may discharge the ink 90 including particles 95 at a set or predetermined level (e.g., amount) or higher.

In one or more embodiments, in the inkjet printing apparatus 1000, the unit droplet amount of the ink 90 discharged from the inkjet head 300 is required to be constant (or substantially constant), and simultaneously (or concurrently) the number of particles 95 dispersed in the unit droplet amount is required to be uniformly (or substantially uniformly) controlled. While the ink 90 is ejected from the inkjet head 300 by the ink circulation system, when the number of particles 95 per unit droplet of the ink 90 is not uniform, reliability of the inkjet printing apparatus 1000 may be problematic. Accordingly, a difference in luminance of the display device 10 may be caused, thereby deteriorating display quality.

According to one or more embodiments, the inkjet printing apparatus 1000 may maintain a flow rate of the ink 90 in an inner flow path through which the ink 90 is supplied by forming an inclination on one surface of the base portion on the inkjet head 300. Accordingly, the number of particles 95 discharged into the unit space may be uniformly (or substantially uniformly) maintained by reducing or preventing the precipitation of the particles 95 dispersed in the ink 90.

Hereinafter, the inkjet head 300 will be described in more detail.

Figure 10:
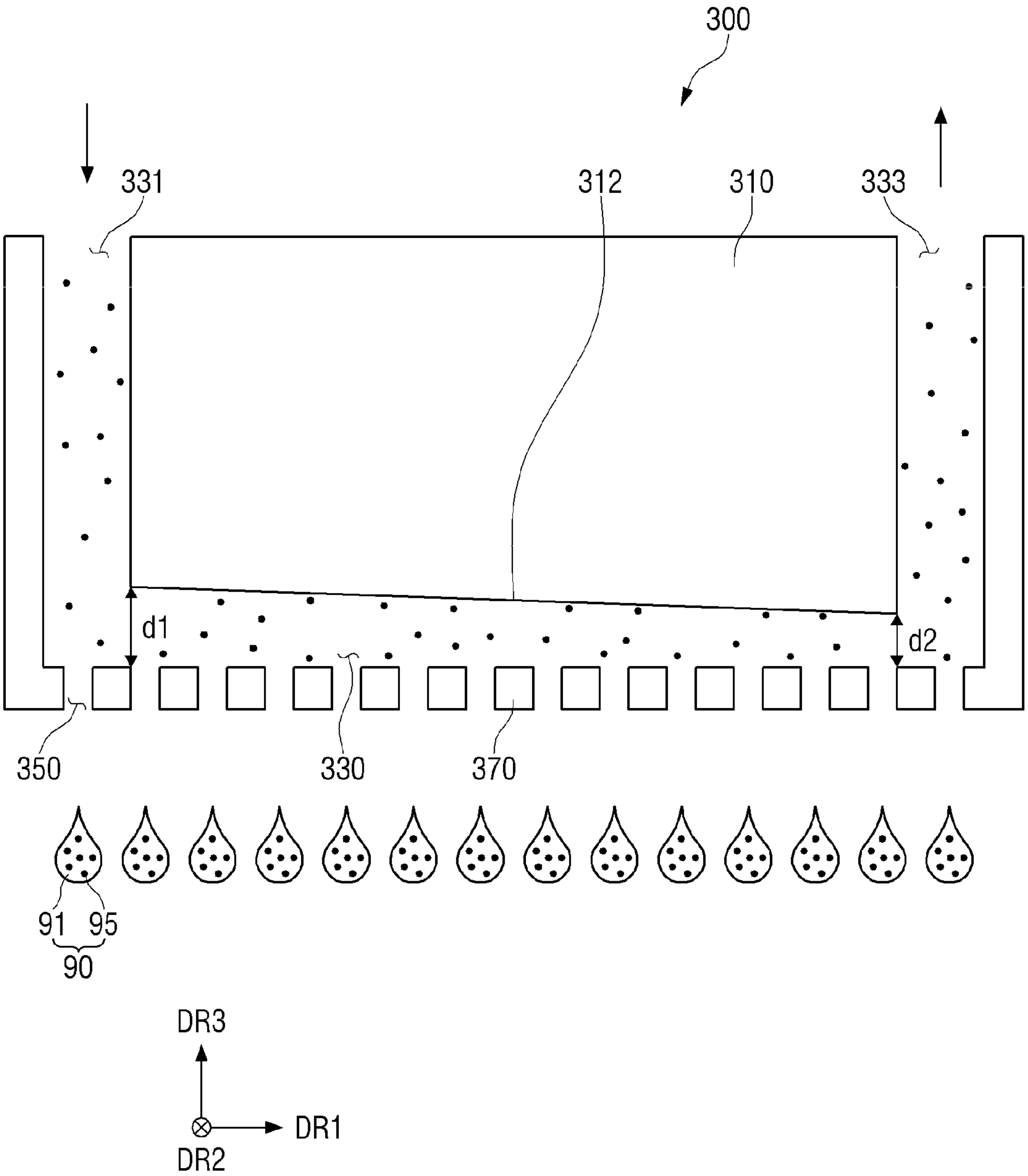
FIG. 10 is a schematic cross-sectional view illustrating an example of an inkjet head according to one or more embodiments.
Figure 11:
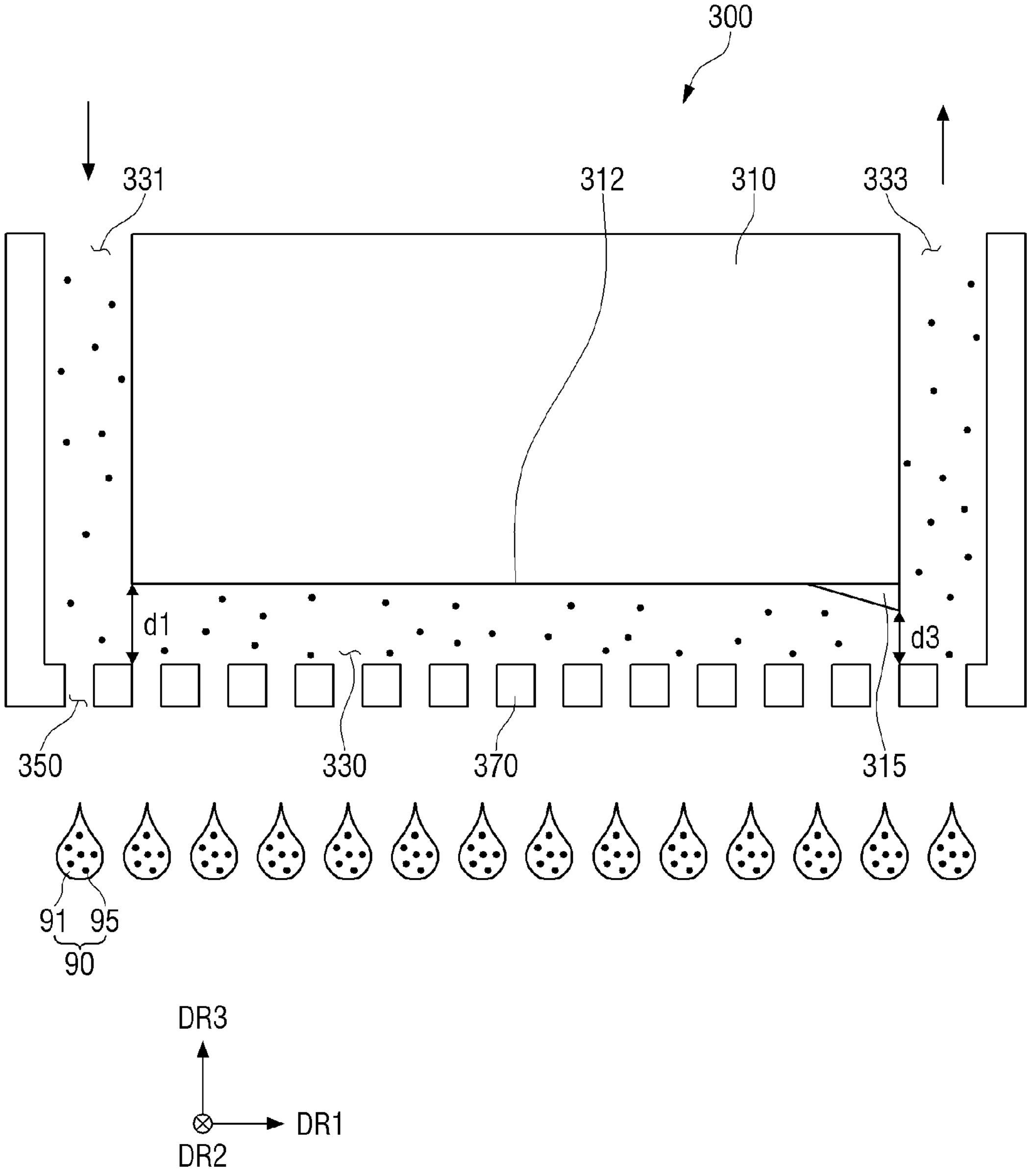
FIGS. 11 and 12 are cross-sectional views schematically illustrating other examples of an inkjet head according to one or more embodiments, respectively.
Figure 12:
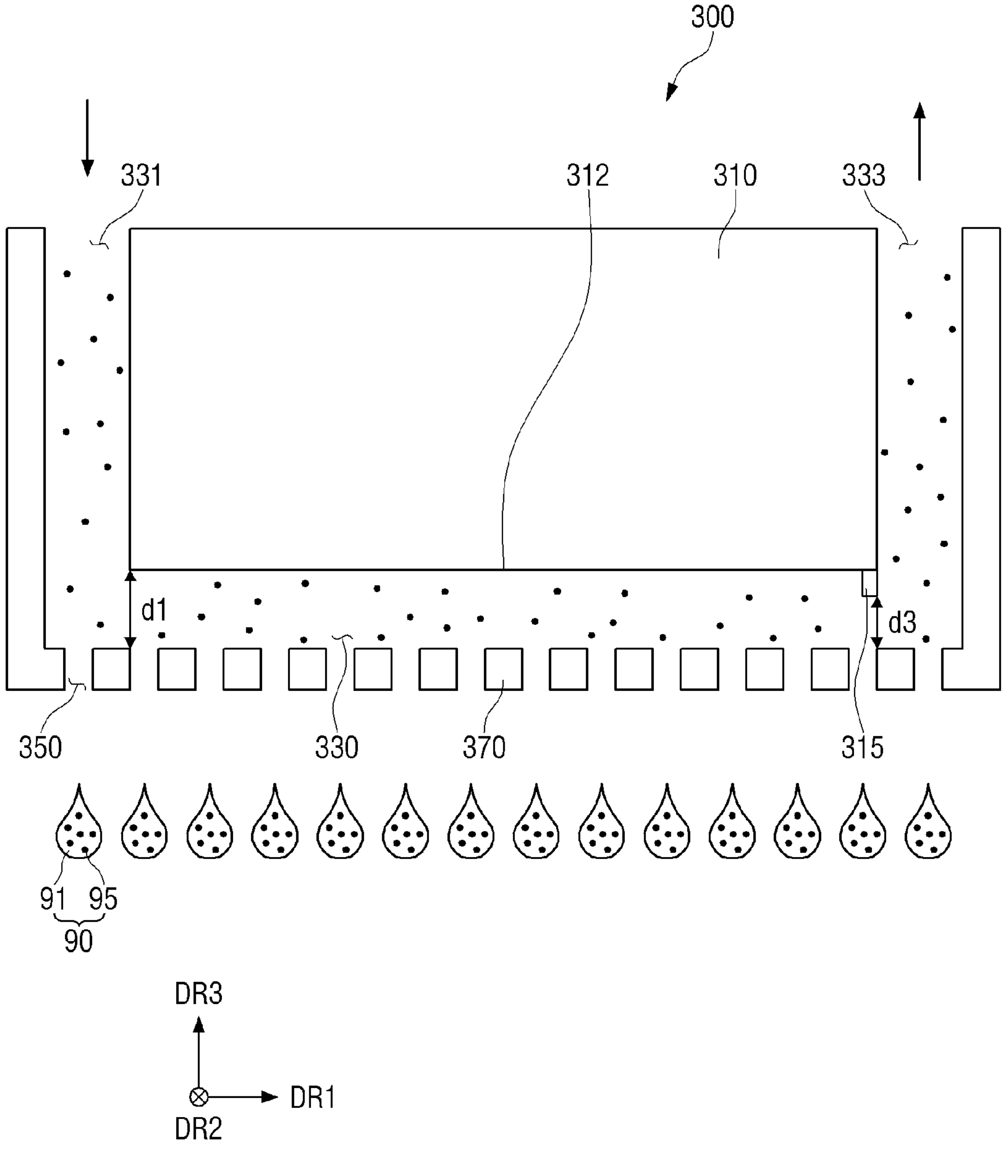

FIG. 10 is a schematic cross-sectional view illustrating an example of an inkjet head according to one or more embodiments. FIGS. 11 and 12 are cross-sectional views schematically illustrating other examples of an inkjet head according to one or more embodiments, respectively.

Referring to FIG. 10, the inkjet head 300 may include a plurality of nozzles 350 and may discharge ink 90 through the nozzles 350. The ink 90 discharged from the nozzles 350 may be sprayed onto the target substrate SUB provided on the stage STA. The nozzles 350 may be located at the bottom of the inkjet head 300 and may be arranged along one direction in which the inkjet head 300 extends.

The inkjet head 300 may include a base portion 310, an inner flow path 330, and a plurality of nozzles 350. The inkjet head 300 may further include a discharge portion 370.

The base portion 310 may constitute a main body of the inkjet head 300. The base portion 310 may be attached to the print head unit 100. The base portion 310 may have a shape extending in the first direction DR1 and the second direction DR2. However, the disclosure is not limited thereto, and the base portion 310 may have a circular shape or a polygonal shape.

The discharge portion 370 may be a portion of the base portion 310 of the inkjet head 300 in which the nozzles 350 are provided. It is shown in FIG. 10 that the discharge portions 370 connected to the base portion 310 and the discharge portions 370 spaced apart from the base portion 310 are provided, and the nozzles 350 are formed therebetween. However, substantially all of the discharge portions 370 may be one member that is not spaced apart from each other and is integrated (e.g., is integral) with each other, and the nozzle 350 may be formed in the shape of a hole penetrating the discharge portion 370. For example, the plurality of discharge portions 370 may not be spaced apart from each other, and may be formed as one member. However, the disclosure is not limited thereto, and in some embodiments, the inkjet head 300 may include a plurality of units including the discharge portion 370 on which the nozzle 350 is formed. In this case, the plurality of discharge portions 370 may be spaced apart from each other and be connected (e.g., physically coupled) to the base portion 310.

The inner flow path 330 may be in the base portion 310 to allow the ink 90 to be supplied from the ink circulation unit 500 through the inner flow path 330. In the print head unit 100, the ink 90 may be supplied through the first connection pipe IL1 connected (e.g., physically coupled) to the ink circulation unit 500, and the ink remaining after being discharged from the nozzles 350 may be supplied to the ink circulation unit 500 through the second connection pipe IL2. In the inner flow path 330 of the inkjet head 300, the ink 90 may be supplied through an inlet 331 of the print head unit 100, and the ink 90 remaining after being discharged may be discharged through an outlet 333 of the print head unit 100.

The base portion 310 may have a shape extending in one direction, and the inner flow path 330 may be formed along the extending direction of the base portion 310. The ink 90 supplied through the print head unit 100 may flow through the inner flow path 330 and then be discharged through the nozzle 350 of the inkjet head 300.

The plurality of nozzles 350 may be in the discharge portion 370 located on one surface of the base portion 310, for example, the lower surface of the base portion 310. The plurality of nozzles 350 may be spaced apart from each other and arranged along the extension direction of the base portion 310, may penetrate through the discharge portion 370 of the base portion 310, and may be connected to the inner flow path 330 to discharge the ink 90. In one or more embodiments, the plurality of nozzles 350 may be arranged in one row or in a plurality of rows. Further, the number of nozzles 350 included in the inkjet head 300 may be 128 to 1800. The nozzles 350 may discharge the ink 90 introduced along the inner flow path 330. The amount of the ink 90 discharged once from each nozzle 350 may be about 1 to about 50 pL (pico-litter), but is not limited thereto.

A plurality of particles 95 are dispersed in the ink 90 discharged from the inkjet head 300. The ink 90 discharged once (e.g., at one time) from the nozzle 350 may include a set or specific number of particles 95 according to the degree of dispersion of the particles 95. In the inner flow path 330 in the inkjet head 300, the flow rate of the ink 90 gradually decreases from the inlet 331 toward the outlet 333, and thus the particles 95 may be precipitated in the inner flow path 330 adjacent to the outlet 333. In this case, the dispersion degree of the particles 95 in the ink 90 may not be maintained constant, and the number of particles 95 in the ink 90 discharged once (e.g., at one time) may be changed.

According to one or more embodiments, the base portion 310 may have an inclination on one surface contacting the inner flow path 330. The base portion 310 may include a first surface 312 contacting the inner flow path 330. The first surface 312 of the base portion 310 may be a surface forming the inner flow path 330. The first surface 312 may have a set or predetermined inclination (e.g., incline) along the first direction DR1.

For example, the first surface 312 of the base portion 310 may be spaced apart from one surface of the discharge portion 370, for example, one surface of the discharge portion 370 facing the base portion 310, by a set or predetermined distance. The distance may be a diameter of the inner flow path 330 in the third direction DR3. One point of (e.g., on) the first surface 312 of the base portion 310 may be spaced apart from the discharge portion 370 by a first distance d1 in a direction perpendicular to the extension direction of the discharge portion 370, that is, in the third direction DR3. The one point of the first surface 312 of the base portion 310 may be on one side of the base portion 310 adjacent to the inlet 331 to which the ink 90 is supplied. Further, another point of (e.g., on) the first surface 312 of the base portion 310 may be spaced apart from the discharge portion 370 by a second distance d2 in the third direction DR3 perpendicular to the extension direction of the discharge portion 370. The other point of the first surface 312 of the base portion 310 may be on the other side of the base portion 310 adjacent to the outlet 333 from which the ink 90 is discharged.

Because the first surface 312 of the base 310 has an inclination, the first distance d1 may be longer (e.g., larger) than the second distance d2. For example, the diameter of the inner flow path 330 adjacent to the inlet 331 may be larger than the diameter of the inner flow path 330 adjacent to the outlet 333. As described above, the flow rate of the ink 90 supplied from the inlet 331 may decrease toward the outlet 333. When the flow rate decreases, the particles 95 included in the ink 90 may be precipitated in the inner flow path 330 adjacent to the outlet 333, thereby causing a decrease in the number of particles 95 discharged from the nozzle 350 adjacent to the outlet 333.

In one or more embodiments, the second distance d2 may be shorter than the first distance d1. For example, the diameter of the inner flow path 330 adjacent to the outlet 333 may be smaller than the diameter of the inner flow path 330 adjacent to the inlet 331, so that a decrease in the flow rate of the ink 90 may be reduced or prevented, thereby maintaining the flow rate constant (or substantially constant). Accordingly, the particles 95 may not be precipitated in the inner flow path 330 adjacent to the outlet 333, and may be discharged through the nozzles 350.

The second distance d2 may be 90% to 99% of the first distance d1. When the second distance d2 is 99% or less of the first distance d1, a decrease in the flow rate of the ink 90 may be reduced or prevented. When the second distance d2 is 90% or more of the first distance d1, a decrease in the discharge amount of the ink 90 through the nozzles 350 may be reduced or prevented.

In some embodiments, the distance between the first surface 312 and the discharge portion 370 may gradually decrease from one side of the first surface 312 of the base portion 310 toward the other side thereof. For example, the diameter of the inner flow path 330 may gradually decrease from the inlet 331 toward the outlet 333. Accordingly, it is possible to maintain the flow rate constant (or substantially constant) by reducing or preventing a decrease in the flow rate of the ink 90.

In one or more embodiments, the first surface 312 of the base portion 310 may include a protrusion 315 to have an inclination (e.g., an incline).

Referring to FIG. 11, the protrusion 315 may be on the side of the first surface 312 of the base portion 310 adjacent to the outlet 333. The protrusion 315 may have increasing (e.g., gradually increasing) thickness measured in the third direction DR3, and thus may have an inclination. The protrusion 315 may be on the first surface 312 adjacent to the outlet 333 to decrease the diameter of the inner flow path 330 in the corresponding portion thereof.

In one or more embodiments, one point of the protrusion 315 may be spaced apart from one surface of the discharge portion 370 by a third distance d3. One point of the protrusion 315 may be on a side of the protrusion 315 adjacent to the outlet 333, and one surface of the discharge portion 370 may be a surface facing the protrusion 315. The above-described first distance d1 may be longer than the third distance d3. For example, the third distance d3 may be shorter than the first distance d1. Accordingly, a decrease in the flow rate of the ink 90 in the area adjacent to the outlet 333 may be reduced or prevented to maintain the flow rate constant (or substantially constant), and thus the particles 95 may not be precipitated in the inner flow path 330 adjacent to the outlet 333 and may be discharged through the nozzles 350.

Referring to FIG. 12, as another example, the protrusion 315 may have an inclination of 90°. The protrusion 315 may be formed in a bar shape of a rectangular parallelepiped, and may be spaced apart from the discharge portion 370 by a third distance d3. However, the disclosure is not limited thereto, and the protrusion 315 may be formed in the shape of a polygonal column or a lenticular lens, and may have any suitable shape as long as the distance between the first surface 312 of the base portion and the discharge portion 370 can be reduced.

Although it is shown in the drawings that the protrusion 315 is provided on the first surface 312 of the base portion 310 as an additional component, the disclosure is not limited thereto, and the protrusion 315 may be formed integrally with the base portion 310 (one body).

Figure 13:
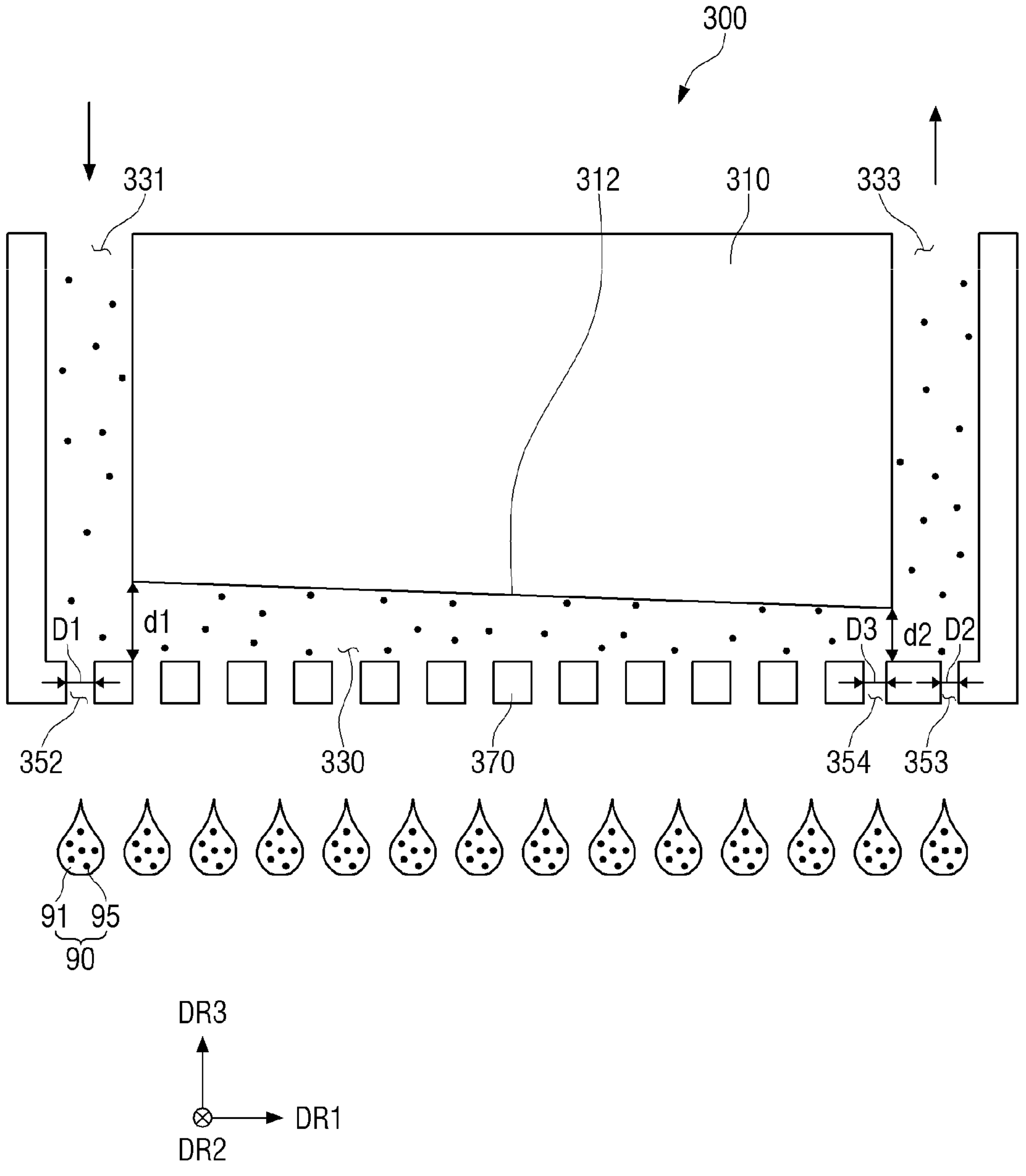
FIG. 13 is a schematic cross-sectional view of an inkjet head according to other one or more embodiments.

FIG. 13 is a schematic cross-sectional view of an inkjet head according to one or more other embodiments.

Referring to FIG. 13, in the inkjet head 300, the first surface 312 of the base portion 310 may have an inclination. The present embodiment is different from the above-described embodiments of FIGS. 10 to 12 in that the diameters of the nozzles 350 are different from each other. Hereinafter, differences will be described in more detail, and duplicative descriptions of the same configuration(s) will not be provided.

The inkjet head 300 according to one or more embodiments may include a plurality of nozzles 350. The plurality of nozzles 350 may include a first nozzle 352 adjacent to the inlet 331 and a second nozzle 353 adjacent to the outlet 333. The first nozzle 352 and the second nozzle 353 may have set or predetermined diameters such that the ink 90 may be discharged. The diameters of the nozzles 352 and 353 may be diameters in the first direction DR1.

The diameter D1 of the first nozzle 352 may be larger than the diameter D2 of the second nozzle 353, and thus, the diameter D2 of the second nozzle 353 may be smaller than the diameter D1 of the first nozzle 352. For example, the diameter D1 of the first nozzle 352 adjacent to the inlet 331 may be larger than the diameter D2 of the second nozzle 353 adjacent to the outlet 333. As described above, the flow rate of the ink 90 supplied from the inlet 331 may decrease toward the outlet 333. When the flow rate decreases, the particles 95 included in the ink 90 may be precipitated in a portion of the inner flow path 330 adjacent to the outlet 333, thereby causing a decrease in the number of particles 95 discharged from the nozzle 350 adjacent to the outlet 333.

In one or more embodiments, the diameter D2 of the second nozzle 353 may be smaller than the diameter D1 of the first nozzle 352. For example, the diameter D2 of the second nozzle 353 adjacent to the outlet 333 may be smaller than the diameter D1 of the first nozzle 352 adjacent to the inlet 331, so that a decrease in the flow rate of the ink 90 discharged through the second nozzle 352 may be reduced or prevented, thereby maintaining the flow rate constant (or substantially constant). Accordingly, the particles 95 may not be precipitated in the inner flow path 330 adjacent to the outlet 333, and may be discharged through the second nozzle 353.

The diameter D2 of the second nozzle 353 may be 90% to 99% of the diameter D1 of the first nozzle 352. When the diameter D2 of the second nozzle 353 is 99% or less of the diameter D1 of the first nozzle 352, a decrease in the flow rate of the ink 90 may be reduced or prevented. When the diameter D2 of the second nozzle 353 is 90% or more of the diameter D1 of the first nozzle 352, a decrease in the discharge amount of the ink 90 through the nozzles 350 may be reduced or prevented.

The discharge portion 370 may further include a third nozzle 354 adjacent to the second nozzle 353. The third nozzle 354 may be closer to the inlet 331 than the second nozzle 353. The third nozzle 354 may have a set or predetermined diameter D3, and the diameter D3 of third nozzle 354 may be larger than the diameter D2 of the second nozzle 353. Because the flow rate of the ink 90 supplied to the inner flow path 330 may decrease toward the outlet 333, the diameter D3 of the third nozzle 354, closer to the inlet 331 than the second nozzle 353, may be larger than the diameter D2 of the second nozzle 353. However, because there is no decrease in flow rate of the ink 90 in the first nozzle 352 closest to the inlet 331, the diameter D1 of the first nozzle 352 may be the largest, and the diameter D3 of the third nozzle 354 may be smaller than the diameter D1 of the first nozzle 352.

In some embodiments, the diameters of the nozzles 350 may gradually decrease from the inlet 331 toward the outlet 333. Accordingly, it is possible to keep the flow rate constant (or substantially constant) by reducing or preventing the flow rate of the ink 90 from gradually decreasing toward the outlet 333.

Figure 14:
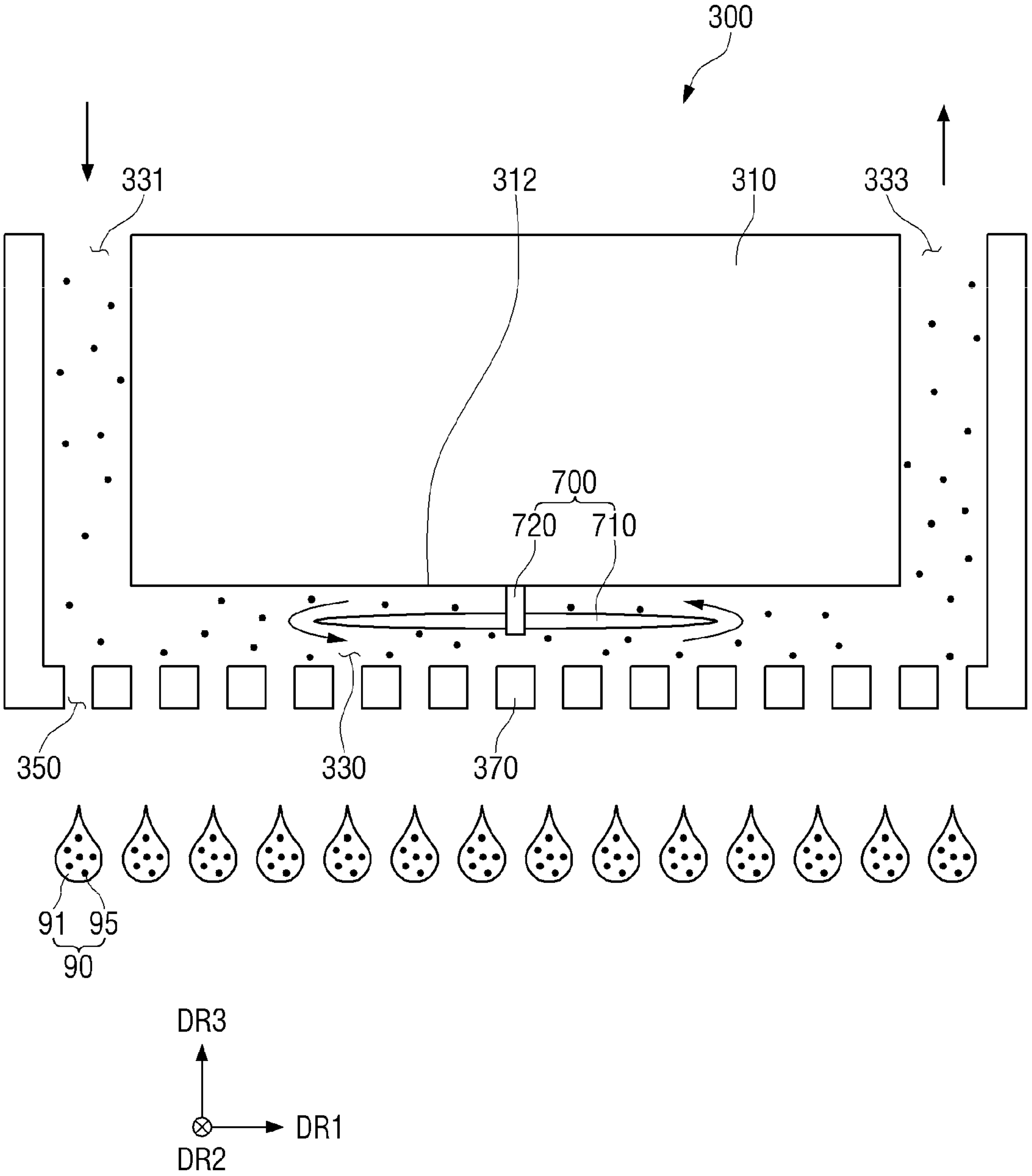
FIG. 14 is a schematic cross-sectional view of an inkjet head according to other one or more embodiments.
Figure 15:
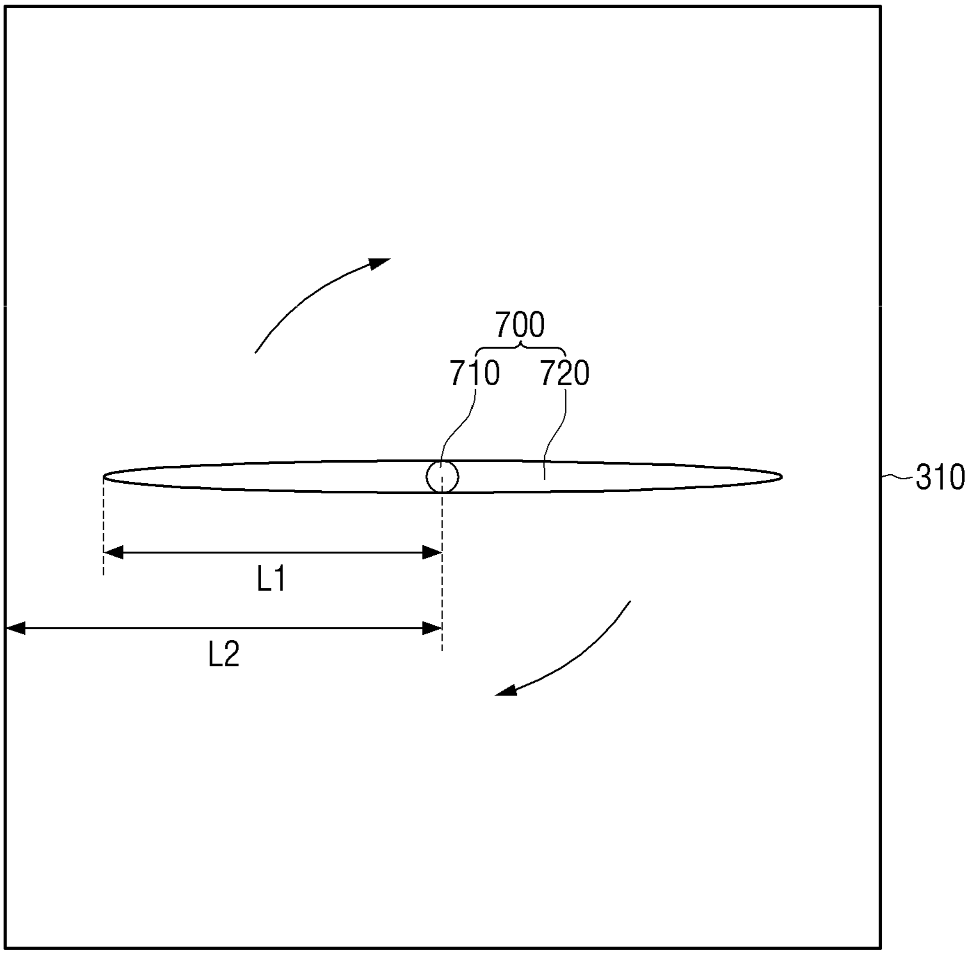
FIG. 15 is a plan view schematically illustrating an example of the bottom surface of a base portion and a rotation member according to other one or more embodiments.
Figure 16:
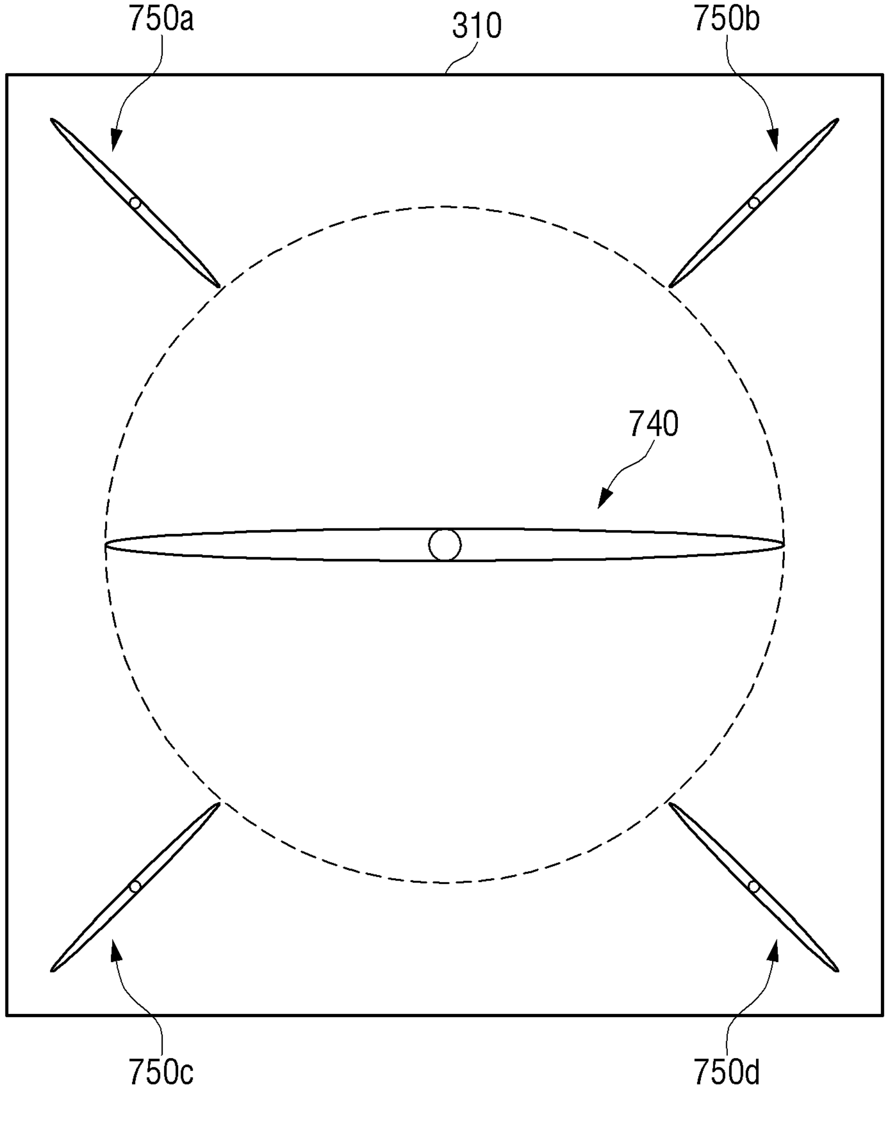
FIG. 16 is a plan view schematically illustrating another example of the bottom surface of a base portion and a rotation member according to other one or more embodiments.

FIG. 14 is a schematic cross-sectional view of an inkjet head according to other one or more embodiments. FIG. 15 is a plan view schematically illustrating an example of the bottom surface of a base portion and a rotation member according to other one or more embodiments. FIG. 16 is a plan view schematically illustrating another example of the bottom surface of a base portion and a rotation member according to other one or more embodiments.

Referring to FIGS. 14 and 15, the inkjet head 300 may include a base portion 310, a discharge portion 370, and an inner flow path 330. The present embodiment is different from the above-described embodiment of FIGS. 10 to 12 in that the base portion 310 does not have an inclination, and a rotation member 700 is provided in the inner flow path 330. Hereinafter, differences will be described in more detail, and duplicative descriptions of the same configuration(s) will not be provided.

In one or more embodiments, a rotation member 700 may be provided in the inner flow path 330. The rotation member 700 may passively rotate according to the flow of the ink 90 to mix the ink 90 supplied to the inner flow path 330. The rotation speed of the rotation member 700 may be substantially the same as the flow rate of the ink 90.

In one or more embodiments, the rotation member 700 may include a rotation shaft 710 fixed to the base portion 310 and a blade 720 coupled to the rotation shaft 710 and rotating in one direction. The rotation shaft 710 may be on one surface of the base portion 310 facing the discharge portion 370. The rotation shaft 710 may be at the center of one surface of the base portion 310. The blades 720 may be formed as a pair of left and right blades extending in the horizontal direction around the rotation shaft 710. Although it is shown in FIG. 14 that the blades 720 may be formed as a pair of left and right blades, the disclosure is not limited thereto, and two or more pairs of blades may be provided. Further, odd-numbered blades, for example, three or five blades, not pairs of blades, may be provided.

The blade 720 may have a set or predetermined length in order to easily (or suitably) mix the ink 90 moving through the inner flow path 330. The length L1 of the blade 720 may be shorter than the length L2 from the rotation shaft 710 to one side surface of the base portion 310. The radius of rotation of the blade 720 may be determined by the length L1 of the blade 720, and the blade 720 may protrude from one side of the base portion 310 such that the blade 720 does not interfere with the sidewalls of the inner flow path 330. In some embodiments, the length L1 of the blade 720 may be substantially the same as the length L2 from the rotation shaft 710 to one side surface of the base portion 310.

Referring to FIG. 16, a plurality of rotation members 700 may be provided in the base portion 310. The plurality of rotation members 700 may include a first rotation member 740 at the center of the base portion 310 and second rotation members 750*a*, 750*b*, 750*c*, and 750*d* at one or more corners of the base portion 310.

The first rotation member 740 may include blades having a set or predetermined length and may rotate with a set or predetermined radius of rotation. The second rotation members 750*a*, 750*b*, 750*c*, and 750*d* may be in an area other than the rotation radius of the first rotation member 740, to mix the ink 90. Each of the second rotation members 750*a*, 750*b*, 750*c*, and 750*d* may be smaller in size than the first rotation member 740. Here, the size of the rotating member refers to the diameter of the rotation shaft 710 and the length of the blade 720. Each of the second rotation members 750*a*, 750*b*, 750*c*, and 750*d* has a relatively small size, and the ink 90 may be mixed in an area other than the rotation radius of the first rotation member 740.

The inkjet head 300 of the inkjet printing apparatus according to the above-described embodiment includes the rotation member 700, so that the ink 90 moving through the inner flow path 330 may be mixed. The plurality of particles 95 included in the ink 90 may be mixed by the rotation member 700 and supplied to the nozzles 350, so that the particles may be uniformly (or substantially uniformly) discharged without being precipitated in the inner flow path 330.

Figure 17:
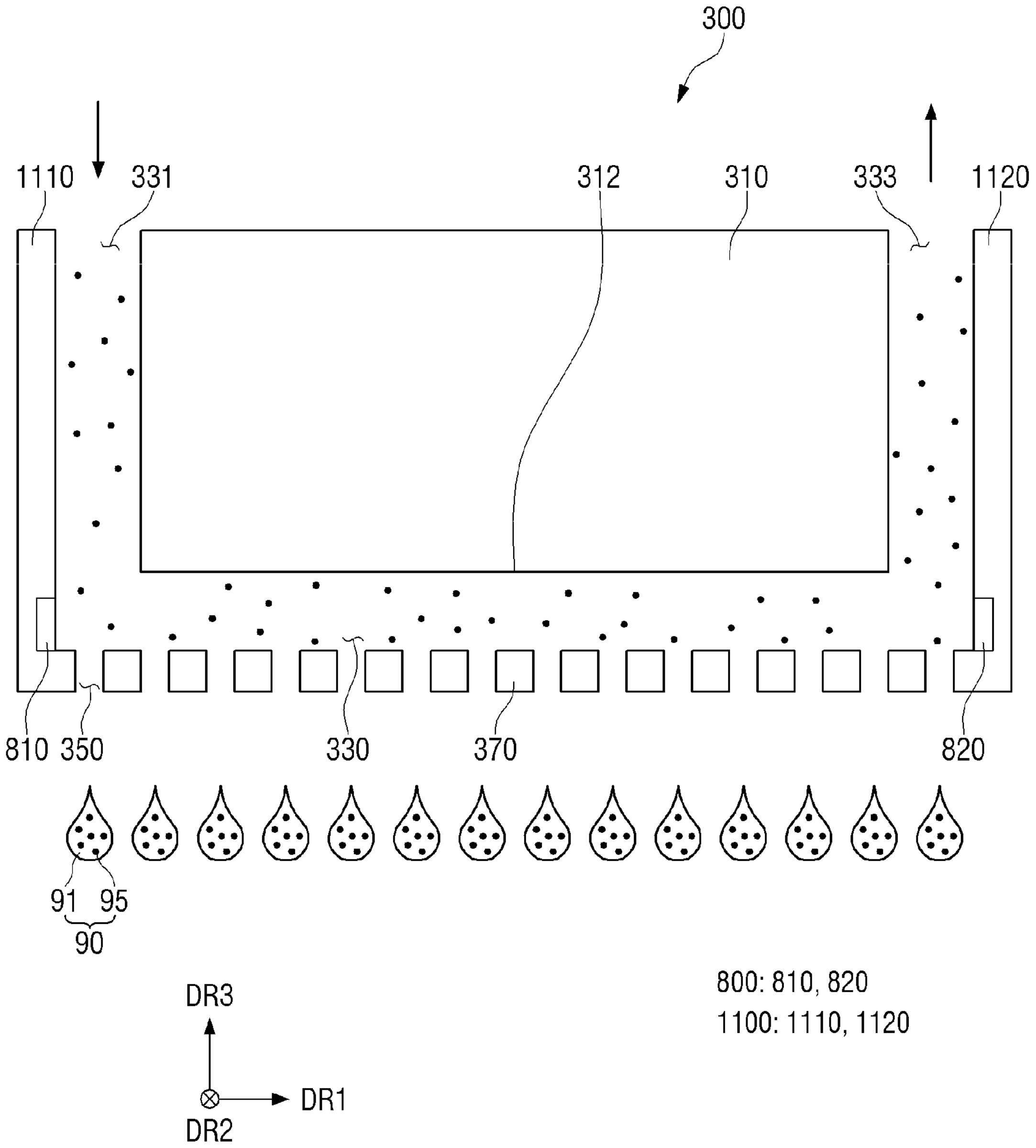
FIG. 17 is a schematic cross-sectional view of an inkjet head according to other one or more embodiments.
Figure 18:
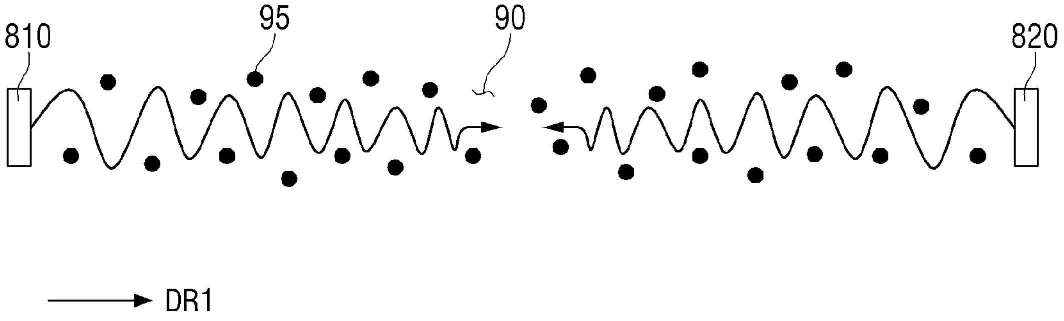
FIG. 18 is a cross-sectional view schematically illustrating a state in which an anti-precipitation member and particles vibrate.
Figure 19:
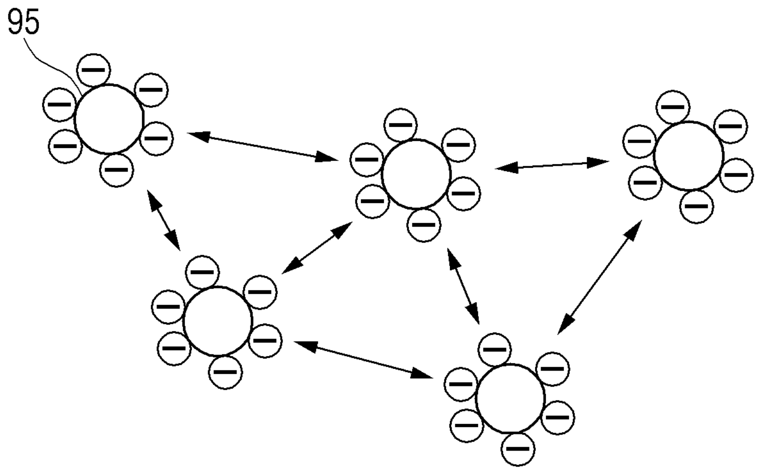
FIG. 19 is a view schematically illustrating a state in which particles are electrically charged.
Figure 20:
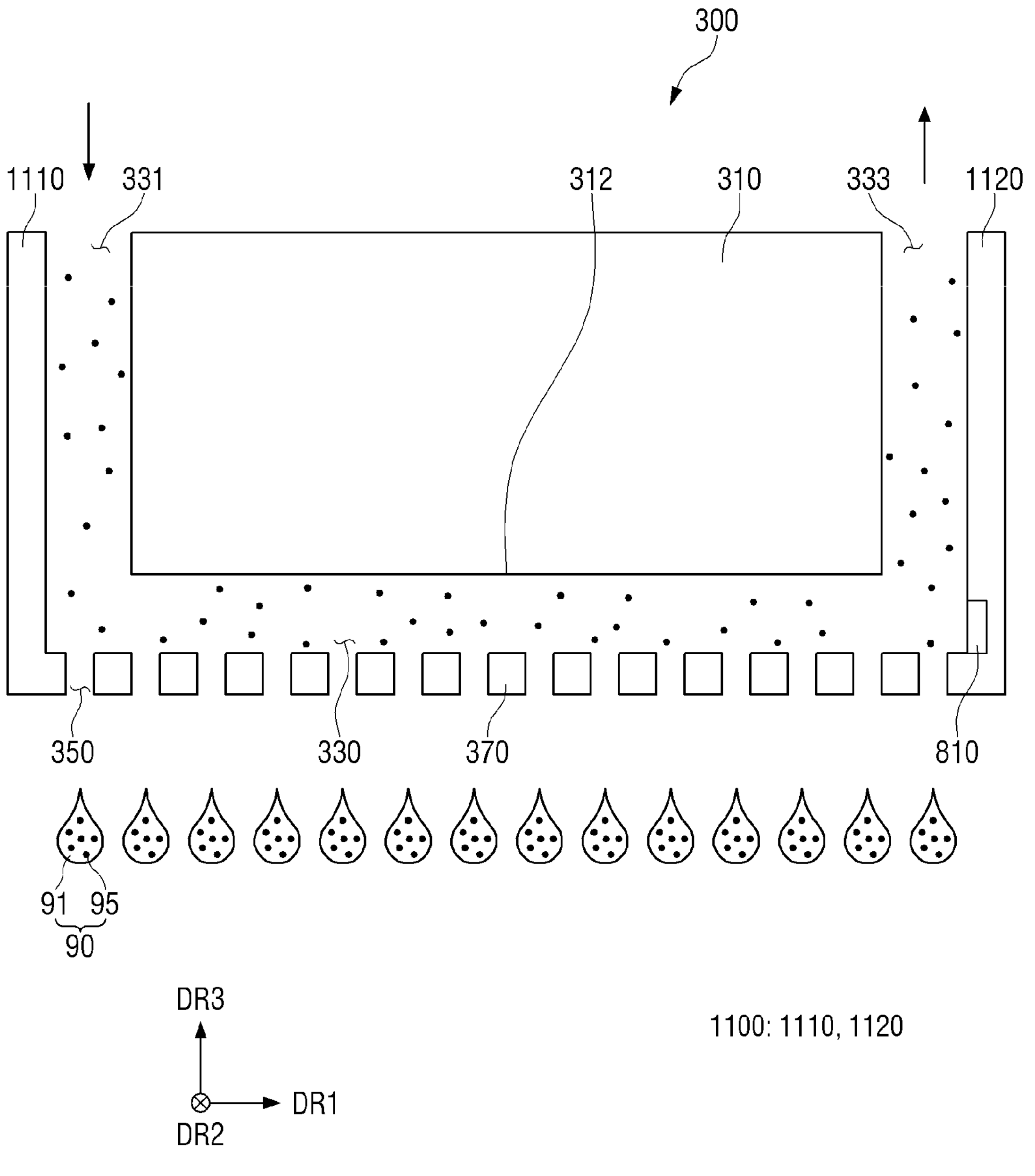
FIG. 20 is a schematic cross-sectional view of an inkjet head according to other one or more embodiments.

FIG. 17 is a schematic cross-sectional view of an inkjet head according to one or more other embodiments. FIG. 18 is a cross-sectional view schematically illustrating a state in which an anti-precipitation member and particles vibrate. FIG. 19 is a view schematically illustrating a state in which particles are electrically charged. FIG. 20 is a schematic cross-sectional view of an inkjet head according to one or more other embodiments.

Referring to FIG. 17, the inkjet head 300 may include a base portion 310, a discharge portion 370, and an inner flow path 330. The present embodiment is different from the above-described embodiment of FIGS. 14 to 16 in that the sidewall portion 1100 of the inkjet head 300 is provided with a precipitation prevention member 800. Hereinafter, differences will be described in more detail, and duplicative descriptions of the same configuration(s) will not be provided.

In one or more embodiments, the inkjet head 300 may further include a sidewall portion 1100 forming a sidewall of the inner flow path 330. The sidewall portion 1100 may be adjacent to the base portion 310 with the inner flow path 330 therebetween. The sidewall portion 1100 may extend in the third direction DR3 from the discharge portion 370.

The sidewall portion 1100 may include a first sidewall portion 1110 extending from the discharge portion 370 and contacting the inlet 331 and a second sidewall portion 1120 extending from the discharge portion 370 and contacting the outlet 333. The first sidewall portion 1110 and the second sidewall portion 1120 may be spaced apart from each other with the base portion 310 therebetween, and may be parallel to each other.

The sidewall portion 1100 may be provided with a precipitation prevention member 800 capable of mixing the plurality of particles 95 dispersed in the ink 90. For example, the precipitation prevention member 800 may include a first precipitation prevention member 810 and a second precipitation prevention member 820. The first precipitation prevention member 810 may be in the first sidewall portion 1110, and the second precipitation prevention member 820 may be in the second sidewall portion 1120. The precipitation prevention members 810 and 820 may be inserted into the sidewall portions 1110 and 1120, respectively, so as not to interfere with the movement of the ink 90 moving through the inner flow path 330. One surface of each of the precipitation prevention members 810 and 820 may be exposed to the inner flow path 330. One surface of each of the precipitation prevention members 810 and 820 may come into contact with the ink 90 moving through the inner flow path 330.

In one or more embodiments, each of the precipitation prevention members 810 and 820 may be an ultrasonic vibrator. The ultrasonic vibrator may generate ultrasonic vibration in one direction to vibrate the ink 90 moving in the inner flow path 330. The ink 90 may vibrate vertically or horizontally in a plane by ultrasonic waves generated from the ultrasonic vibrator.

The ultrasonic vibrator may be formed as a converter capable of converting AC power into ultrasonic vibration. Further, the ultrasonic vibrator may be formed as a piezoelectric element capable of converting an electric signal into a vibration signal. Power required to impart ultrasonic vibration may be supplied from an external power supply unit. In one or more embodiments, in addition to an external power supply, there may also be provided a display in which ultrasonic frequencies and amplitudes are displayed as digital or waveform curves.

As shown in FIG. 18, in the first precipitation prevention member 810 formed as an ultrasonic vibrator, ultrasonic vibration may be generated in the first direction DR1, and in the second precipitation prevention member 820 formed as an ultrasonic vibrator, ultrasonic vibration may be generated in a direction opposite to the first direction DR1. The ink 90 and the particles 95 dispersed in the ink 90 may be mixed by being horizontally vibrated by ultrasonic vibration.

As described above, the plurality of particles 95 included in the ink 90 may be mixed by ultrasonic vibration by providing the precipitation prevention member 800 formed as an ultrasonic vibrator. Accordingly, the particles 95 are supplied to the nozzles 350 without being precipitated in the inner flow path 330, so that the uniform (or substantially uniform) number of particles 95 may be discharged.

Referring to FIGS. 17 and 19, in one or more other embodiments, each of the precipitation prevention members 810 and 820 may be a charging plate. The charging plate may be an electrode to which a positive voltage or a negative voltage is applied. The charging plate may charge the particles 95 of the ink 90 contacting the charging plate with a positive (+) or a negative (−) charge. In the ink 90, the particles 95 may be charged with the same (+) or (−) to generate a repulsive force therebetween. The charging plate may receive power required for charging the particles 95 from an external power supply unit.

Referring to FIG. 20, in the present embodiments, the first precipitation prevention member 810 may be provided only in the second sidewall portion 1120. As described above, because the flow rate of the ink 90 decreases in the inner flow path 330 adjacent to the outlet 333 and causes the precipitation of the particles 95, the precipitation prevention member 810 may be provided in the second sidewall portion 1120 adjacent to the outlet 333 to reduce or prevent the precipitation of the particles 95. However, the disclosure is not limited thereto, and the first precipitation prevention member 810 may be provided only in the first sidewall portion 1110 adjacent to the inlet 331.

The inkjet head 300 of the inkjet printing apparatus according to the above-described embodiment includes the precipitation prevention member 800, so that the particles 95 of the ink 90 moving in the inner flow path 330 may be dispersed. The plurality of particles 95 included in the ink 90 may be dispersed by the precipitation prevention member 800 and supplied to the nozzles 350, so that a uniform (or a substantially uniform) number of particles 95 may be discharged without being precipitated in the inner flow path 330. Accordingly, the number of particles 95 per unit droplet of the ink 90 may be made uniform (or substantially uniform), and it may be possible to reduce or prevent a difference in luminance from occurring in the display device 10.

In concluding the detailed description, those skilled in the art will appreciate that many variations and modifications can be made to the embodiments without substantially departing from the principles of the present disclosure as defined by the following claims and their equivalents. Therefore, the disclosed embodiments of the disclosure are used in a generic and descriptive sense only and not for purposes of limitation.

What is claimed is:

1. An inkjet printing apparatus, comprising:

a stage; and an inkjet head over the stage and comprising a plurality of nozzles through which ink comprising a plurality of particles is discharged, wherein the inkjet head comprises:

a base portion constituting a main body of the inkjet head;

a discharge portion adjacent to the base portion and comprising the plurality of nozzles;

an inner flow path between the base portion and the discharge portion and configured to accommodate the ink; and at least one rotation member to rotate in the inner flow path to mix the ink, wherein the rotation member comprises a rotation shaft coupled to the base portion, and a blade coupled to the rotation shaft and configured to rotate in one direction, and wherein a plurality of rotation members are provided, and the plurality of rotation members comprise a first rotation member and a second rotation member smaller than the first rotation member.

2. The inkjet printing apparatus of claim 1, wherein a length of the blade is shorter than a distance from the rotation shaft to one side surface of the base portion.

3. The inkjet printing apparatus of claim 1, wherein the first rotation member is at a center of the base portion, and the second rotation member is in at least one corner of the base portion.

* * * * *